US008170223B2

(12) United States Patent
Keele, Jr.

(10) Patent No.: US 8,170,223 B2

(45) Date of Patent: *May 1, 2012

(54) CONSTANT-BEAMWIDTH LOUDSPEAKER ARRAY

(75) Inventor: D. Broadus Keele, Jr., Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 12/651,890

(22) Filed: Jan. 4, 2010

(65) Prior Publication Data

US 2010/0104117 A1 Apr. 29, 2010

Related U.S. Application Data

(63) Continuation of application No. 10/701,256, filed on Nov. 4, 2003, now Pat. No. 7,826,622.

(60) Provisional application No. 60/473,513, filed on May 27, 2003.

(51) Int. Cl.

*H04R 29/00* (2006.01)
*H04R 9/06* (2006.01)
*H04B 3/00* (2006.01)
*H04B 5/00* (2006.01)

(52) U.S. Cl. ............ 381/59; 381/336; 381/335; 381/77; 381/79

(58) Field of Classification Search .................. 381/300, 381/303, 77, 59, 17–18, 97–98, 335–336

See application file for complete search history.

(56) References Cited

U.S. PATENT DOCUMENTS 3,645,355 A 2/1972 Long
4,071,112 A 1/1978 Keele, Jr.
4,104,641 A 8/1978 Unz
4,174,019 A 11/1979 Kramer
4,187,926 A 2/1980 Henricksen et al.
4,237,340 A 12/1980 Klipsch (Continued)

FOREIGN PATENT DOCUMENTS

EP 0 386 846 9/1990

(Continued)

OTHER PUBLICATIONS

The Application of Broadband Constant Beamwidth Transducer (CBT) Theory to Loudspeaker Arrays, D.B. (Don) Keele, Jr., AES 109$^{th}$ Convention, Los Angeles, Sep. 22-25, 2000.

(Continued)

*Primary Examiner* — Devona Faulk
*Assistant Examiner* — George Monikang
(74) *Attorney, Agent, or Firm* — Brinks Hofer Gilson & Lione

(57) ABSTRACT

A loudspeaker is provided for receiving an incoming electrical signal and transmitting an acoustical signal that is directional and has a substantially constant beamwidth over a wide frequency range. The loudspeaker may include a curved mounting plate that has curvature over a range of angles. The loudspeaker may include an array of speaker drivers coupled to the mounting plate. Each speaker driver may be driven by an electrical signal having a respective amplitude that is a function of the speaker driver's respective location on the mounting plate. The function may be a Legendre function. Alternatively, the loudspeaker may include a flat mounting plate. In this case, the respective electrical signal driving each speaker may have a phase delay that virtually positions the speaker onto a curved surface.

30 Claims, 23 Drawing Sheets

U.S. PATENT DOCUMENTS

| | | | | |
|---|---|---|---|---|
| 4,280,585 | A | 7/1981 | Nakanishi | |
| 4,289,929 | A | 9/1981 | Hathaway | |
| 4,308,932 | A | 1/1982 | Keele, Jr. | |
| 4,344,504 | A | 8/1982 | Howze | |
| 4,348,552 | A | 9/1982 | Siccone | |
| 4,387,270 | A | 6/1983 | Sakano | |
| 4,391,346 | A | 7/1983 | Murakami et al. | |
| 4,410,063 | A | 10/1983 | Yasue et al. | |
| 4,437,540 | A | 3/1984 | Murakami et al. | |
| 4,503,930 | A | 3/1985 | McDowell | |
| 4,580,655 | A | 4/1986 | Keele, Jr. | |
| 4,637,490 | A | 1/1987 | Oxner | |
| 4,653,606 | A | 3/1987 | Flanagan | |
| 4,654,835 | A | 3/1987 | Fientuch | |
| 4,685,532 | A | 8/1987 | Gunness | |
| 4,845,759 | A | 7/1989 | Danley | |
| 4,940,108 | A | 7/1990 | Selby | |
| 4,991,687 | A | 2/1991 | Oyaba et al. | |
| 5,109,419 | A | 4/1992 | Griesinger | |
| 5,164,549 | A | 11/1992 | Wolf | |
| 5,526,325 | A | 6/1996 | Sullivan et al. | |
| 5,590,214 | A | 12/1996 | Nakamura | |
| 5,642,429 | A | 6/1997 | Janssen | |
| 5,657,391 | A | 8/1997 | Jyosako | |
| 5,742,693 | A | 4/1998 | Elko et al. | |
| 5,809,153 | A | 9/1998 | Aylward et al. | |
| 6,016,353 | A | 1/2000 | Gunness | |
| 6,070,461 | A | 6/2000 | Gjessing et al. | |
| 6,112,847 | A | 9/2000 | Lehman | |
| 6,118,883 | A | 9/2000 | Rocha | |
| 6,394,223 | B1 | 5/2002 | Lehman | |
| 6,556,687 | B1 | 4/2003 | Manabe | |
| 6,597,797 | B1 | 7/2003 | Betts | |
| 6,603,862 | B1 | 8/2003 | Betts | |
| 6,628,796 | B2 * | 9/2003 | Adamson | 381/342 |
| 6,961,438 | B1 | 11/2005 | Fujita | |
| 7,110,550 | B2 | 9/2006 | Motojima et al. | |
| 7,298,853 | B2 | 11/2007 | Norris et al. | |
| 7,343,018 | B2 | 3/2008 | Van der Werff | |
| 7,684,574 | B2 | 3/2010 | Keele, Jr. et al. | |
| 7,826,622 | B2 | 11/2010 | Keele, Jr. | |
| 2005/0025318 | A1 | 2/2005 | Sadaie et al. | |

FOREIGN PATENT DOCUMENTS

| | | | |
|---|---|---|---|
| EP | 1199907 | A2 | 4/2002 |
| EP | 1 422 969 | | 5/2004 |
| GB | 2 303 990 | A | 3/1997 |
| JP | 6-307107 | | 1/1994 |
| JP | 6-225379 | | 12/1994 |
| WO | WO 01/23104 | A2 | 4/2001 |
| WO | WO 2004/071129 | A2 | 8/2004 |

OTHER PUBLICATIONS

Implementation of Straight-Line and Flat-Panel Constant Beamwidth Transducer (CBT) Loudspeaker Arrays Using Signal Delays, D.B. (Don) Keele, Jr. AES 113$^{th}$ Convention Oct. 5-8, 2002, Los Angeles, California USA.

The Full-Sphere Sound Field of Constant Beamwidth Transducer (CBT) Loudspeaker Line Arrays, D.B. (Don) Keele, Jr., AES 114$^{th}$ Convention Mar. 22-25, 2003, Amsterdam, The Netherlands.

New Approach to a Constant Beamwidth Transducer, Peter H. Rogers and A. L. Van Buren, J. Acoust. Soc. Am., 64(1), Jul. 1978.

Experimental Constant Beamwidth Transducer, A. L. Van Buren, L. Dwight Luker, M. D. Jevnager, and A. C. Tims, J. Acoust. Soc. Am. 73(6), Jun. 1983.

Amar G. Bose, Prof. of EE M.I.T., "Sound Recording and Reproduction, Part One: Devices, Measurements, and Perception; Part Two: Spatial and Temporal Dimensions", Technology Review, vol. 75, No. 7, Jun. 1973.

"What's So Sacred About Exponential Horns?" by D.B. Keele, Jr., May 1975.

AES Journal of the Audio Engineering Society Audio/Acoustics/Applications, vol. 44, No. 6, Jun. 1996.

AES Journal of the Audio Engineering Society, Audio/Acoustics/Applications, vol. 18, No. 6, Dec. 1970.

AES Journal of the Audio Engineering Society, Audio/Acoustics/Applications, vol. 26, No. 9, Sep. 1978.

International Search Report, Sep. 15, 2006, PCT/US2006/008365, 4 pgs.

* cited by examiner

CONSTANT-BEAMWIDTH LOUDSPEAKER ARRAY

This application is a continuation of U.S. patent application Ser. No. 10/701,256 filed Nov. 4, 2003, which claims the benefit of U.S. Provisional Application Ser. No. 60/473,513 filed May 27, 2003, both of which are incorporated by reference in their entirety.

FIELD OF THE INVENTION

This invention relates generally to loudspeakers, and more particularly to a loudspeaker array that facilitates the generation of a constant-beamwidth sound field.

BACKGROUND OF THE INVENTION

A typical loudspeaker enclosure is a source for a sound field. For example, a typical loudspeaker enclosure may be used to generate a sound field for "live" sound reinforcement, for home entertainment, for car audio, for a discothèque, or the like. Generally, three-dimensional radiation patterns of sound fields generated by a typical loudspeaker vary with frequency. Such a sound field also may not be focused, and spectral content of the sound field may vary with direction. In applications where a sound filed is generated in an enclosed or a partially enclosed space, an unfocused sound field may cause constructive and destructive wave interference patterns, which may further distort the sound field at different locations.

A theoretically ideal loudspeaker, on the other hand, produces a sound field with a spectral content that does not vary with direction, and which has three-dimensional radiation patterns that are constant over a wide frequency range. For certain applications, such as use in an enclosed or partially enclosed space, it may be desirable to have a loudspeaker that has constant directivity in addition to radiation patterns that are constant over a wide frequency range. A loudspeaker with radiation patterns that do not differ significantly with respect to frequency is referred to herein as a constant-directivity or a constant-beamwidth loudspeaker.

Various methods have been used in the sound industry to attempt to construct a constant-beamwidth loudspeaker that overcomes the above mentioned problems. The use of horns, arrays and higher order sources have all been implemented. In sonar applications, constant-beamwidth transducers using spherical caps have been described in the literature. So far, none of these approaches have overcome the problems described above that are associated with typical loudspeakers. It would be desirable to provide a constant-beamwidth loudspeaker that produces a sound field with spectral content that does not vary significantly with direction and that has three-dimensional radiation patterns that are relatively consistent over a wide frequency range.

SUMMARY

A loudspeaker is provided for receiving an incoming electrical signal and transmitting an acoustical signal that is directional and has a substantially constant beamwidth over a frequency range. The loudspeaker may include a curved mounting plate outer surface over a range of angles. The loudspeaker may include an array of speaker drivers coupled to the mounting plate. Each speaker driver may be powered by a respective electrical signal having an attenuation level that is a function of the speaker driver's location on the mounting plate. The function may be based on a Legendre function.

Alternatively, the loudspeaker may include a flat mounting plate. In this case, each speaker driver may be driven by a respective electrical signal that has a respective phase delay that virtually positions the speaker driver onto a curved surface by delaying sound waves produced by the speaker driver enough so that the sound waves appear to come from a position behind the speaker driver. In this manner, virtual positions of the speaker drivers simulate a curved mounting plate for the speaker drivers.

The loudspeaker may also have a spherically curved mounting plate. Where the mounting plate is spherically curved, the speaker drivers may be arranged in rings centered about a point on the mounting plate. Each speaker driver in a given ring may be driven by the same electrical signal. Alternatively, the loudspeaker may have a curved, wedge-shaped mounting plate. In this case, the speakers may be arranged symmetrically around a point on the mounting plate, and each pair of speakers that have a common distance from the point may be driven by a common electrical signal.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE FIGURES

The invention can be better understood with reference to the following figures. The components in the figures are not necessarily to scale; emphasis is instead being placed upon illustrating the principles of the invention. Moreover, in the figures, like reference numerals designate corresponding parts throughout the different views.

DETAILED DESCRIPTION OF THE PREFERRED EMBODIMENTS

Constant-Beamwidth Transducer Theory

Figure 1:
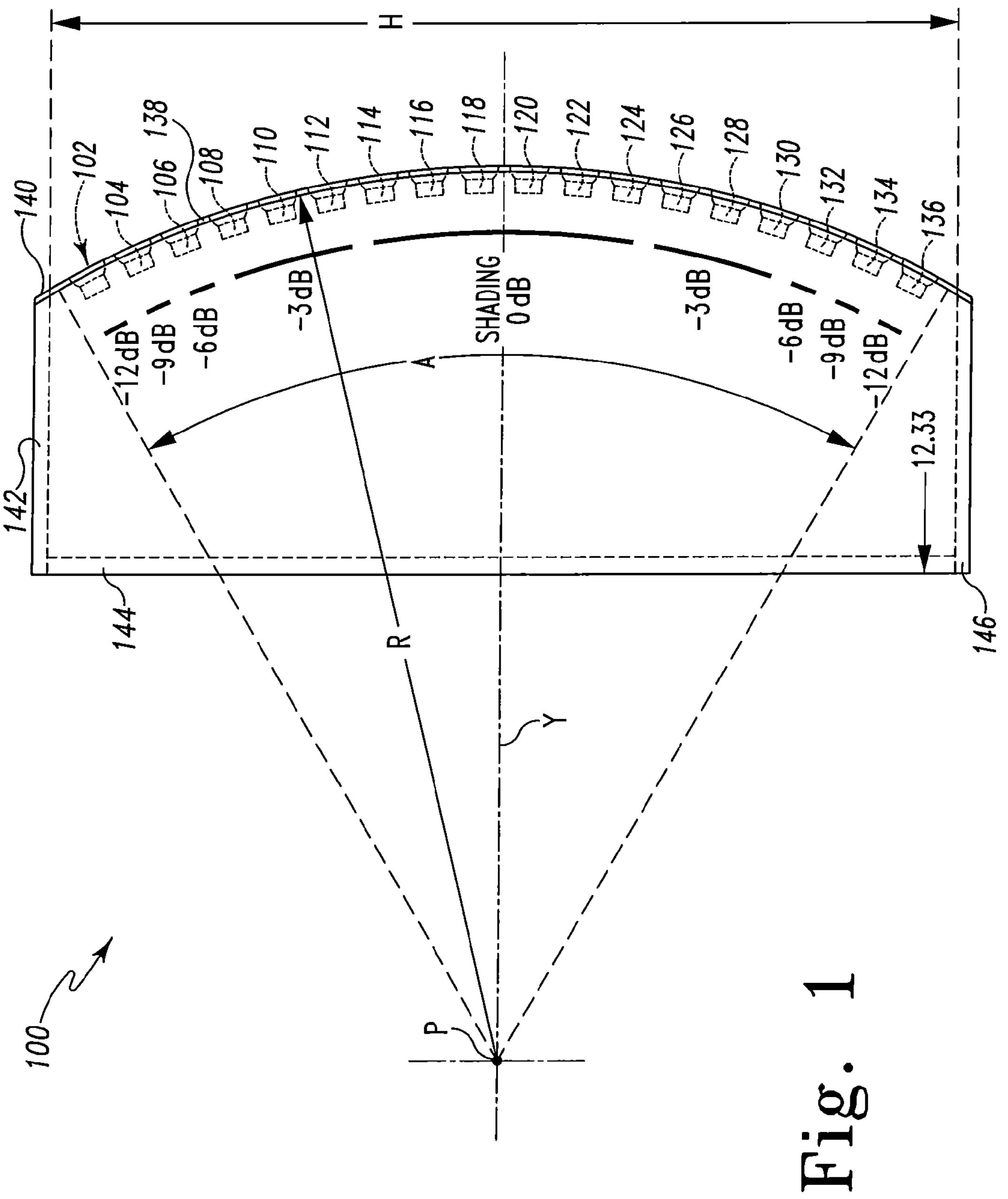
FIG. 1 is a side view of a first loudspeaker enclosure for a speaker array.

An ideal transducer in the form of a rigid circular spherical cap of arbitrary half angle whose normal surface velocity (pressure) is attenuated according to a Legendre function may function as an ideal constant-beamwidth transducer. The Legendre attenuation may be independent of frequency. Such an ideal transducer may produce a broadband, symmetrical, directional acoustic field. The acoustic field may have a beam pattern and a directivity that are essentially independent of frequency over all frequencies above a determined cut-off frequency, and that change very little as a function of distance from the ideal transducer. Such an ideal transducer may cover an arbitrary coverage angle with a constant-beamwidth that extends over a virtually unlimited operating bandwidth.

If a radial velocity or, equivalently, a sound pressure level on the outer surface of a rigid sphere conforms to:

$$u(\theta) = \begin{cases} P_v(\cos\theta) & \text{for } \theta \le \theta_0 \\ 0 & \text{for } \theta > \theta_0 \end{cases} \tag{1}$$

where $u(\theta)$=radial velocity distribution $\theta$=elevation angle in spherical coordinates, ($\theta$=0 is center of circular spherical cap)

$\theta_0$=half angle of spherical cap $P_v(x)$=Legendre function of order v (v>0) of argument x, then an approximation of a far-field pressure pattern, above a determined cutoff frequency (which depends on the size of the sphere and the wavelength), will be:

$$p(\theta) = \begin{cases} P_v(\cos\theta) & \text{for } \theta \le \theta_0 \\ 0 & \text{for } \theta > \theta_0 \end{cases} \tag{2}$$

where $p(\theta)$ = radial pressure distribution.

The Legendre function $P_v(\cos\theta)$ may be equal to one at $\theta$=0, and may have a first zero at angle $\theta=\theta_0$, the half angle of the spherical cap. The Legendre function order (v) may be chosen so that the first zero of the Legendre function occurs at the half angle of the spherical cap. The far-field sound pressure level pattern may be essentially equal to the sound pressure level on the surface of the spherical cap.

Arguably an ideal constant-beamwidth transducer would be in the form of an entire circular sphere, not merely a spherical cap. The surface pressure and velocity would be nearly zero over a large inactive portion of the outer surface of such a sphere, however. Therefore, the part of the sphere outside of a spherical cap region can be removed without significantly changing acoustic radiation patterns. In other words, a spherical cap may have a nearly ideal constant-beamwidth behavior even though the rest of the sphere is missing.

The advantages of a constant-beamwidth transducer above the cutoff frequency may include an essentially constant beam pattern, very low side lobes, and a pressure distribution at all distances out to the far-field that is approximately equal to the surface distribution. Because both the surface velocity and surface pressure have the same dependence on $\theta$, the local specific acoustic impedance may be independent of $\theta$. Thus, the entire transducer may be uniformly loaded.

A simplified four-term series approximation to the Legendre attenuation of equation (1) is:

$$U(x) \approx \begin{cases} 1 + 0.066x - 1.8x^2 + 0.743x^3 & \text{for } x \le 1 \\ 0 & \text{for } x > 1 \end{cases} \tag{3}$$

where $$x = \text{normalized angle } \left(\frac{\theta}{\theta_0}\right)$$

Locations "outside" an active spherical cap region (where attenuation is less than 13.5 dB) may be removed without significantly changing acoustic radiation patterns. Therefore, the simplified four-term series approximation of equation (3) can be recalculated by truncating the attenuation where it rises above 13.5 dB. A revised four-term series approximation, where 13.5 dB attenuation occurs where the normalized angle x=1 may be stated as:

$$U_{trunc}(x) \approx \begin{cases} 1 + 0.0561x - 1.3017x^2 + 0.457x^3 & \text{for } x \le 1 \\ 0 & \text{for } x > 1 \end{cases} \tag{4}$$

where $$x = \text{normalized angle } \left(\frac{\theta}{\theta_0}\right)$$

Equation (4) may be derived from equations (3) by substituting $x=0.8504\acute{x}$. For example, the first, second and third order terms may be derived as follows:

First: $+0.066*(0.8504)^1=+0.0561$

Second: $-1.8*(0.8504)^2=-1.3017$

Third: $+0.743*(0.8504)^3=+0.457$

The revised four-term series approximation of equation (4) "expands" the attenuation values over the active region so that the 13.5 dB attenuation points may occurs at x=1.

Constructing a constant-beamwidth transducer in the form of a rigid circular spherical cap producing varying sound pressure levels may not be practical for loudspeaker applications. It is practical, however, to simulate such a rigid circular spherical cap with an array of discrete speaker drivers (speakers) in a loudspeaker enclosure. The speaker drivers may be arranged to form a circular or toroidal cap or wedge. Methods for designing and constructing such an array of speakers, referred to herein as a “speaker array”, or simply an “array”, are described in detail below.

As used here in, the terms “attenuation”, “attenuate”, and “attenuated” refer generally to a relative sound pressure levels, or relative electrical signal levels. For example, for an array of speaker drivers, the speaker driver or drivers producing the highest sound pressure level are said to be “attenuated” to 0 dB, and sound pressure levels generated by the remaining speaker drivers are indicated relatively. Likewise, where more than one electrical signal is present, the electrical signal having the highest level is said to be “attenuated” to 0 dB, and the levels of the remaining electrical signals are indicated relatively.

For speaker arrays, which comprise discrete speaker drivers, an upper-operational frequency limitation (upper-operational frequency) exists that has a wave-length approximately equal to the center-to-center spacing of the speaker array. At frequencies above the upper-operational frequency, the constant-beamwidth behavior of the speaker array may deteriorate.

Because the speaker drivers of the speaker array are discrete, the development of off-axis lobes may cause a sonic beam radiated by the speaker array to become uncontrollably wide above the upper-operational frequency. The response may drop abruptly above the upper-operational frequency, because the speaker array’s energy is spread out over a much wider angle. The attenuation above the upper-operational frequency may be essentially chaotic. To help compensate for this attenuation, the individual speaker drivers of the speaker array may be selected to individually provide a measure of narrow coverage. This may allow the speaker array to approximate its lower-frequency behavior at higher frequencies.

The center-to-center spacing of the speaker array’s speaker drivers may determine the upper-operational frequency. The size of the speaker array and the speaker array’s angular coverage, however, may determine the lower-operational frequency for constant-beamwidth operation. The relationship between the size of the speaker array, the angular coverage of the sonic beam produced by the array, and the lower-operational frequency is approximately the same as the corresponding relationships for constant directivity horns:

$$X = \frac{K}{\theta f_i} \tag{5}$$

where

X=horn mouth width (or height)

$\theta$=coverage angle of horn (−6 dB point)

$f_i$=frequency down to which coverage angle is maintained

K=constant ($2.5\times10^4$ meters-degs-Hz, or $1\times10^6$ inches-degs-Hz)

For example, a speaker array providing 65 degrees of constant-beamwidth coverage down to 1.15 kHz should be about 334 mm high. The first example speaker array described below is designed to provide about 45 degrees of constant-beamwidth coverage down to approximately 555 Hz (lower-operational frequency), and is therefore 1.0 m high. The relationships between the above mathematical models and physical loudspeaker enclosures is explained in greater detail below.

Curved-Arc Constant-Beamwidth Speaker Array Construction

Figure 2:
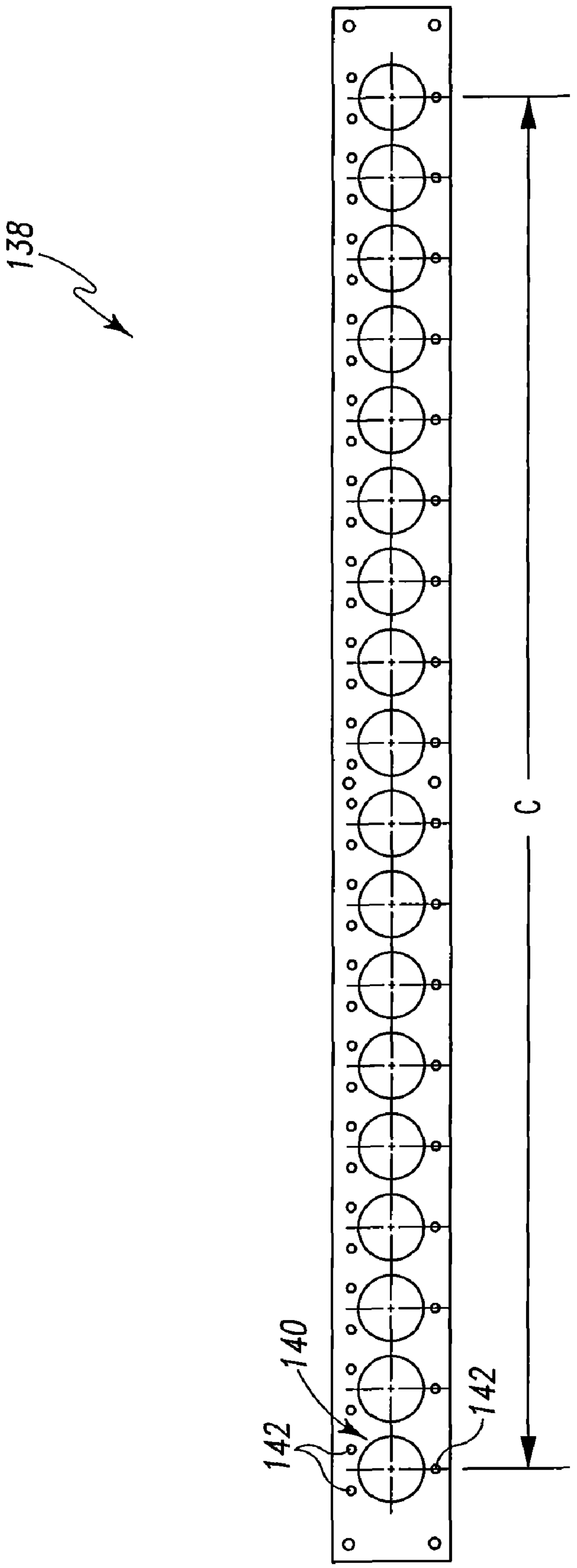
FIG. 2 is a faceplate for the loudspeaker enclosure of FIG. 1.
Figure 7:
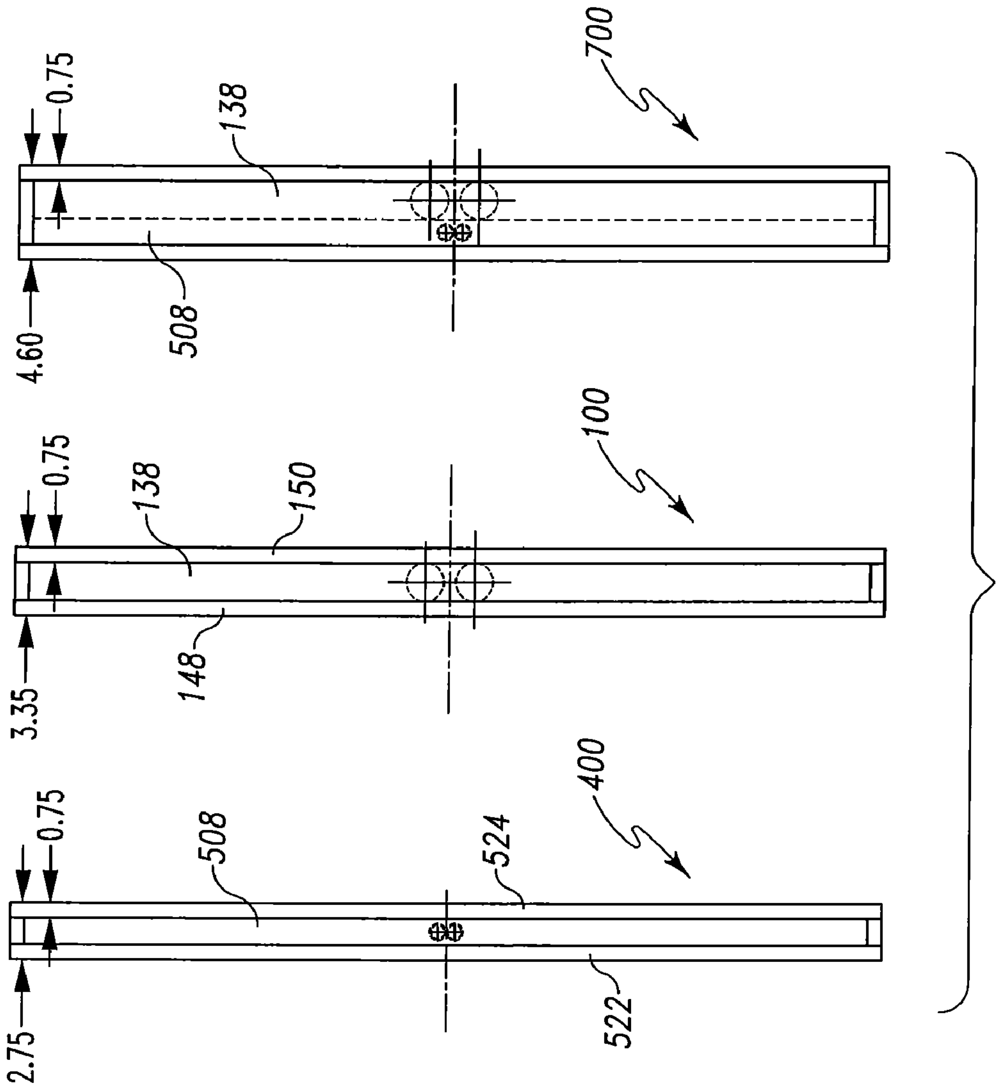
FIG. 7 is front views of the first loudspeaker enclosure of FIG. 1, the second loudspeaker enclosure of FIG. 4, and a third loudspeaker enclosure.

FIG. 1 is a side view of a first example loudspeaker enclosure 100. The loudspeaker enclosure 100 may include an array of speaker drivers 102-136, a face plate or mounting plate 138, a first cabinet piece 142, a second cabinet piece 144, and a third cabinet piece 146. The loudspeaker enclosure 100 may also include a fourth cabinet piece 148, and a fifth cabinet piece 150, which are shown in FIG. 7. The loudspeaker enclosure 100 may be constructed from a rigid material, such as wood, plastic, a composite material, or the like. FIG. 2. is a front view of the mounting plate 138. The mounting plate 138 may be fabricated from a flexible rigid material, such as plastic, in order to facilitate construction.

Returning to FIG. 1, the speaker drivers 102-136 may each be miniature wide-band drivers, such as 57 mm full-range (100 Hz to 20 kHz) speaker drivers used in an Apple® iMac, or any of similar speaker drivers used in laptop computers, flat panel monitors, desktop speaker enclosures, and the like. The speaker drivers 102-136 may each include a movable surface having an area, and the areas of the movable surfaces of the speaker drivers 102-136 may be substantially equal in size. The inherent high-frequency beaming of such speaker drivers may allow the loudspeaker enclosure 100 to maintain a nearly constant beam-width at frequencies of up to 16 kHz, even though according the constant-beamwidth mathematical equations discussed above the upper-operational frequency should only be approximately 5.8 kHz.

The mounting plate 138 of the loudspeaker enclosure 100 may have a curvature radius (R) of, for example, 1.0 m over an angle (A), for example, of 60°. Therefore, the angle (A) of the speaker array may be 60°, and the half-angle ($\theta_0$) may be 30°. The center-to-center spacing (C) of the speaker drivers 102-136 may be 59 mm, as shown in FIG. 2. Returning to FIG. 1, the height (H) of the loudspeaker enclosure 100, measured from the outer edges of the outermost speaker drivers 102 and 136, may be 1 m.

Each speaker driver 102-136 of the array may be coupled to the mounting plate 138 at a respective angle ($A_x$) measured from a point (P) on an axis (Y) perpendicular to and running through the center of the mounting plate. For design considerations, the angle (A) of the speaker array may be measured from one half of a center-to-center spacing beyond the outer most speaker drivers 102 and 136. Measuring the angle (A) of the speaker array in this fashion ensures that the outermost speaker drivers 102 and 136 are within the arc of the angle (A). If the angle (A) of the speaker array were to be measured from the centers of the outermost speaker drivers 102 and 136, for example, calculated attenuation values for the speaker drivers 102 and 136 would be effectively infinite, rendering the speaker drivers 102 and 136 practically useless.

Using equation (4) above with the values for the example loudspeaker enclosure 100 allows the calculation of attenuation values for the speaker drivers 102-136. Alternatively, equation (1) or (3) may also be used to calculate attenuation values for the speaker drivers 102-136. To simplify the construction of the loudspeaker enclosure 100, however, stepped or quantized attenuation values may be used. For example, using equation (4) as the basis for quantized attenuation values yields:

$$U_{stepped}(x) = \begin{cases} 1 & \text{for } 0 \geq x < 0.4026 \\ 0.7071 & \text{for } 0.4026 \geq x < 0.6654 \\ 0.5 & \text{for } 0.6654 \geq x < 0.8209 \\ 0.3536 & \text{for } 0.8209 \geq x < 0.9261 \\ 0.25 & \text{for } 0.9261 \geq x \leq 1 \\ 0 & \text{for } x > 1 \end{cases} \tag{6}$$

where $$x = \text{normalized angle } \left(\frac{\theta}{\theta_0}\right)$$

In equation (6), the numerical ranges may be the boundaries where values of x in equation (4) transition from one quantization level to the next. For example, where x=0.4026, the attenuation level may transition from 0 dB to 3 dB. The quantized attenuation values used in this example are approximately to the nearest 3 dB level, so that attenuation approximations start at 0 dB (no attenuation), and drop by multiples of 3 dB. Other quantization resolutions or no quantization at all, may also be used. Shown in TABLE 1 below, for each speaker driver 102-136, is an attenuation value U(x) calculated using equation (3), a truncated attenuation value $U_{trunc}(x)$ calculated using equation (4), the truncated attenuation value in decibels, and a quantized attenuation value calculated using equation (6).

TABLE 1

| Speaker driver | Angle ($A_x$) | Normalized Angle $x = \theta/\theta_0$ | Attenuation Value U (x) | Truncated Attenuation Value $U_{trunc}$ (x) | Truncated Attenuation Value in dB | Quantized Attenuation Value in dB |
|---|---|---|---|---|---|---|
| 102 | 28.33 | 0.94 | 0.083 | 0.277 | −11.2 | −12 |
| 104 | 25.00 | 0.83 | 0.235 | 0.407 | −7.8 | −9 |
| 106 | 21.67 | 0.72 | 0.389 | 0.534 | −5.5 | −6 |
| 108 | 18.33 | 0.61 | 0.538 | 0.652 | −3.7 | −3 |
| 110 | 15.00 | 0.50 | 0.676 | 0.760 | −2.4 | −3 |
| 112 | 11.67 | 0.39 | 0.797 | 0.852 | −1.4 | −3 |
| 114 | 8.33 | 0.28 | 0.895 | 0.925 | −0.7 | 0 |
| 116 | 5.00 | 0.17 | 0.964 | 0.975 | −0.2 | 0 |
| 118 | 1.67 | 0.06 | 0.998 | 0.999 | 0.0 | 0 |
| 120 | −1.67 | 0.06 | 0.998 | 0.999 | 0.0 | 0 |
| 122 | −5.00 | 0.17 | 0.964 | 0.975 | −0.2 | 0 |
| 124 | −8.33 | 0.28 | 0.895 | 0.925 | −0.7 | 0 |
| 126 | −11.67 | 0.39 | 0.797 | 0.852 | −1.4 | −3 |
| 128 | −15.00 | 0.50 | 0.676 | 0.760 | −2.4 | −3 |
| 130 | −18.33 | 0.61 | 0.538 | 0.652 | −3.7 | −3 |
| 132 | −21.67 | 0.72 | 0.389 | 0.534 | −5.5 | −6 |
| 134 | −25.00 | 0.83 | 0.235 | 0.407 | −7.8 | −9 |
| 136 | −28.33 | 0.94 | 0.083 | 0.277 | −11.2 | −12 |

As can be seen in TABLE 1, with the quantization values chosen for this example, the speaker drivers 114-124 may be divided into sub-arrays having equal quantized attenuation values. A first sub-array may comprise speaker drivers 114-124, each of which has a quantized attenuation value of 0 dB. A second sub-array may comprise speaker drivers 108-112 and 126-130, each of which has a quantized attenuation value of −3 dB, and so on. Because there may only be five sub-arrays, the eighteen speaker drivers 114-124 may be driven by as few as five passive attenuation circuits, or as few as five amplifiers. The amplifiers (not shown) for driving the five sub-arrays may be included in the loudspeaker enclosure 100.

Figure 3:
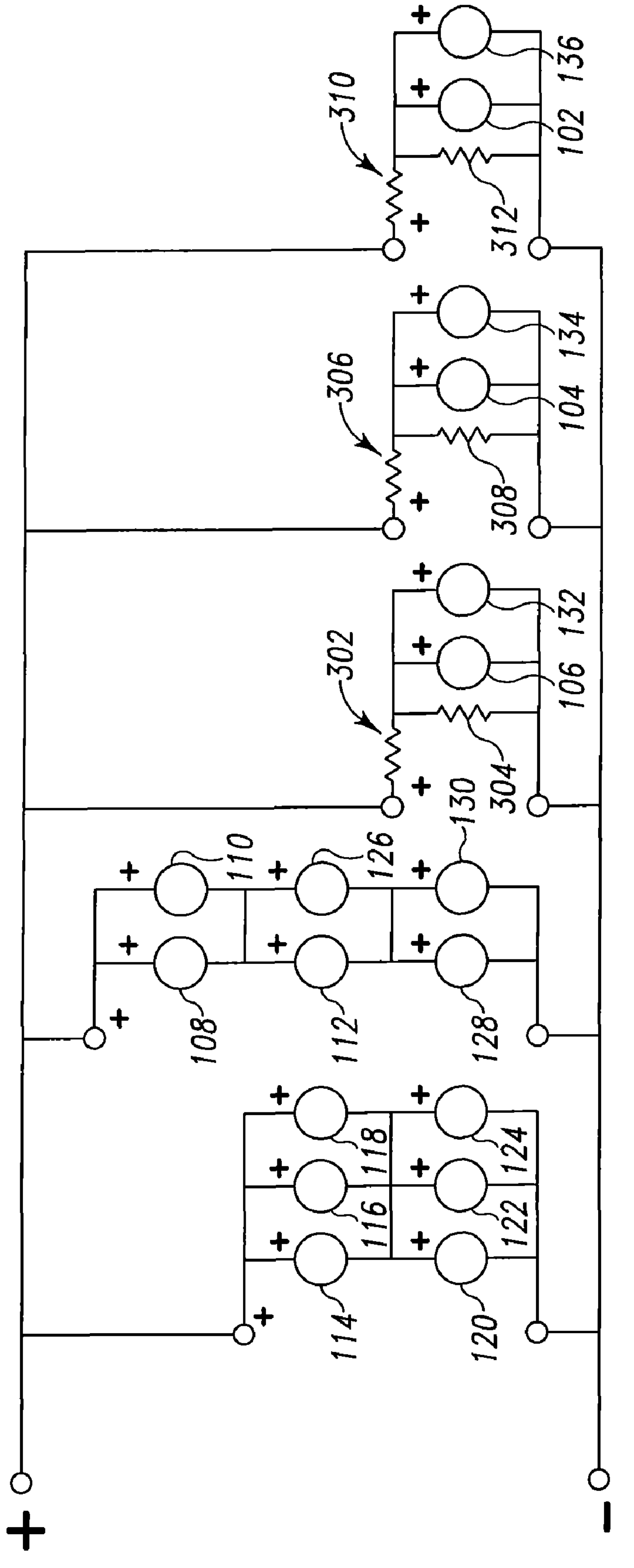
FIG. 3 is a schematic for the loudspeaker enclosure of FIG. 1.

An example schematic diagram is shown in FIG. 3 that provides the approximate attenuation values shown in TABLE 1 with a minimal use of components. For the example configuration shown in FIG. 3, the impedance of each of the speaker drivers 102-136 may be about 4.0 Ohms. For constant-beamwidth operation, relative, as opposed to absolute, attenuation of each of the speaker drivers 114-124 is relevant. For example, attenuation for each of speaker drivers 114-124 may be increased or decreased by a constant, as long as each of the speaker drivers 114-124 has a nearly identical change.

The first sub-array (speaker drivers 114-124) may be arranged in a series/parallel combination such that a combined impedance of the first sub-array is about 4.4 Ohms. Likewise, the second sub-array (speaker drivers 108-112 and 126-130) may be arranged such that the combined impedance of the second sub-array is about 9.9 Ohms. A third sub-array, comprising speaker drivers 106 and 132, may be arranged in a series/parallel combination with a first resistor 302 having an resistance of about 2.5 Ohms and a second resistor 304 having an resistance of about 1.0 Ohms to yield an impedance of about 3.3 Ohms for the third sub-array.

Similarly, a fourth sub array, comprising the speaker drivers 104 and 134, may be arranged with third resistor 306 having an resistance of about 3.8 Ohms and a fourth resistor 308 having a resistance of about 1.0 Ohms to yield an impedance of about 4.6 Ohms for the fourth sub-array. Finally, a fifth sub-array, comprising the speaker drivers 102 and 136, may be arranged with fifth resistor 310 having an resistance of about 5.7 Ohms and a sixth resistor 312 having a resistance of about 1.0 Ohms to yield a total impedance of about 6.5 Ohms for the fifth sub-array The impedance of the entire example network shown in FIG. 3 may be about 1.0 Ohms. Therefore, the attenuation for the speaker drivers 114-124 may be about −6 dB, for the speaker drivers 108-112 and 126-130 may be about −9.5 dB, for the speaker drivers 106 and 132 may be about −15 dB, and for the speaker drivers 102 and 136 may be about −18 dB. As can be seen from TABLE 1, each of the speaker drivers 102-136 may have an attenuation that is roughly 6 dB below the quantized attenuation value. Because the beamwidth is a function of the relative attenuation of the speaker drivers 102-136, the attenuation provided by the example impedance network shown in FIG. 2 conforms to the values shown in Table 1. In order to use the example loudspeaker enclosure 100 with a standard sound amplifier that has an output impedance of 4.0 or 8.0 Ohms, an impedance matching transformer (not shown) may be used. Such an impedance matching transformer may be included within the loudspeaker enclosure 100, or may be positioned between the loudspeaker enclosure 100 and an amplifier (not shown) providing power to the loudspeaker enclosure 100.

The example schematic diagram shown in FIG. 3 allows the loudspeaker enclosure 100 to be constructed with speaker drivers with about equal impedances. For mass production, however, it may be desirable to fabricate the speaker drivers 102-136 with differing impedances by custom winding the coils included in each of the speaker drivers 102-136. Furthermore, the loudspeaker enclosure 100 may be constructed for use with multiple amplifiers (not shown). For example, five amplifiers (not shown) may be power the five sub-arrays of speaker drivers, so that one amplifier provides power to one sub-array. Such amplifiers may be either internal or external to the loudspeaker enclosure 100, and may provide desired attenuation without the use of passive components or custom-built speaker drivers.

As explained in reference to the equations (1) through (4) above, a sound pressure level in a far sound field produced by a constant-beamwidth transducer is approximately equal to a sound pressure level in a near sound field. A vertical coverage area, or a vertical beamwidth, is defined as a portion of a sonic beam produced by a constant-beamwidth transducer where sound pressure levels are greater than −6 dB. As shown in TABLE 1, the speaker drivers 106 and 132 are attenuated with −6 dB, and are each 21.7° off center. Therefore, the theoretical vertical coverage angle of the example loudspeaker enclosure 100 is 43.4° over the operational frequency range.

Figure 4:
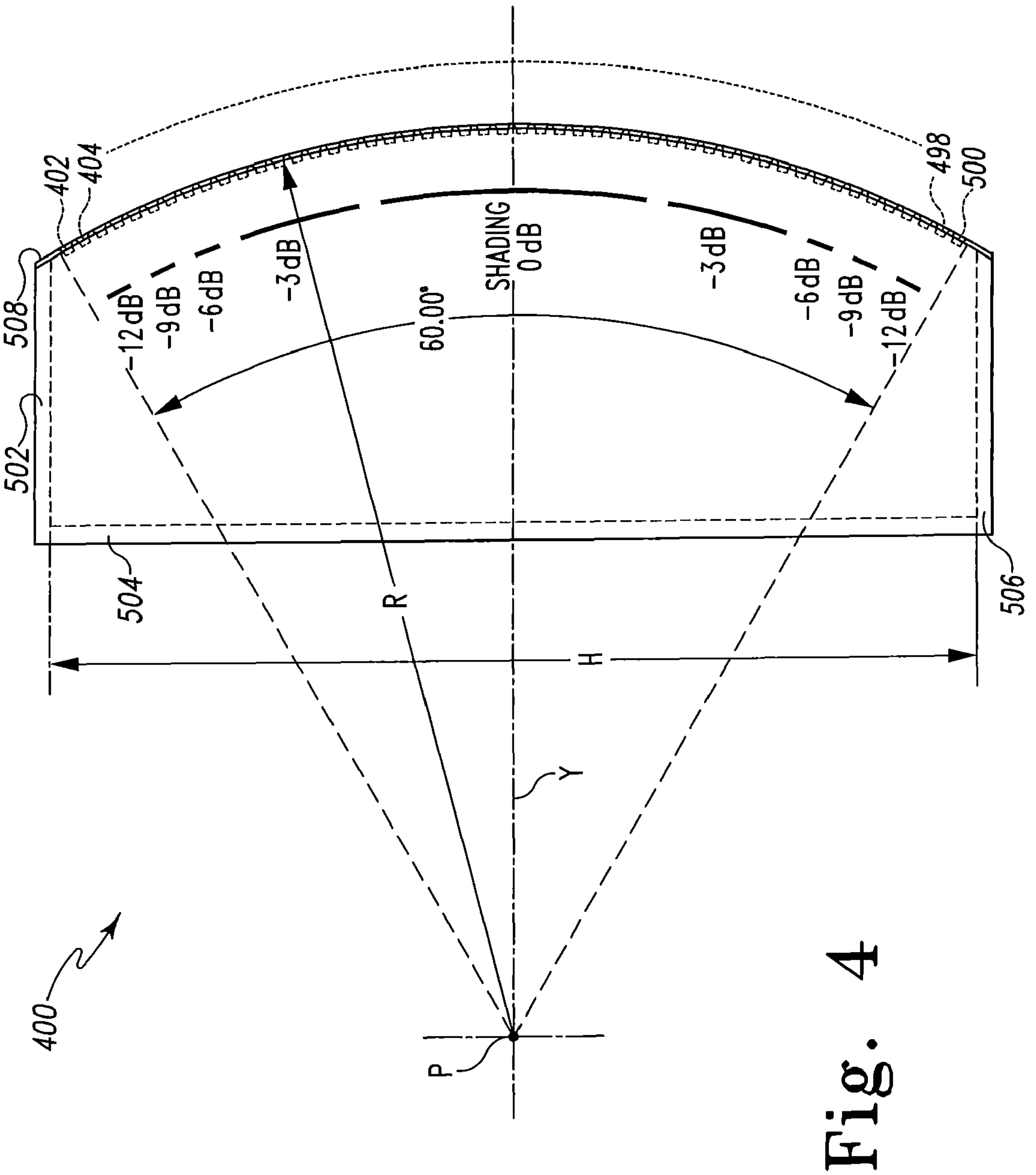
FIG. 4 is a side view of a second loudspeaker enclosure for a speaker array.

FIG. 4 is a side view of a second example loudspeaker enclosure 400. The second loudspeaker enclosure 400 may include an array of fifty speaker drivers 402-500, a face plate or a mounting plate 508, a first cabinet piece 502, a second cabinet piece 504, and a third cabinet piece 506. The second loudspeaker enclosure 400 may also include a fourth cabinet piece 522 and a fifth cabinet piece 524, which are shown in FIG. 7. The loudspeaker enclosure 400, including the mounting plate 508, may be constructed in the same manner as described above for the first loudspeaker enclosure 100.

The speaker drivers 402-500 may each be miniature wide-band transducers, such as the 18.3 mm full-range (400 Hz to 20 kHz) speaker drivers used in several models of laptop computers, or a similar speaker driver. Similar to the loudspeaker enclosure 100, the inherent high-frequency beaming of such speaker drivers may allow the loudspeaker enclosure 400 to display constant-beamwidth characteristics beyond the theoretical upper-operational frequency.

Figure 5:
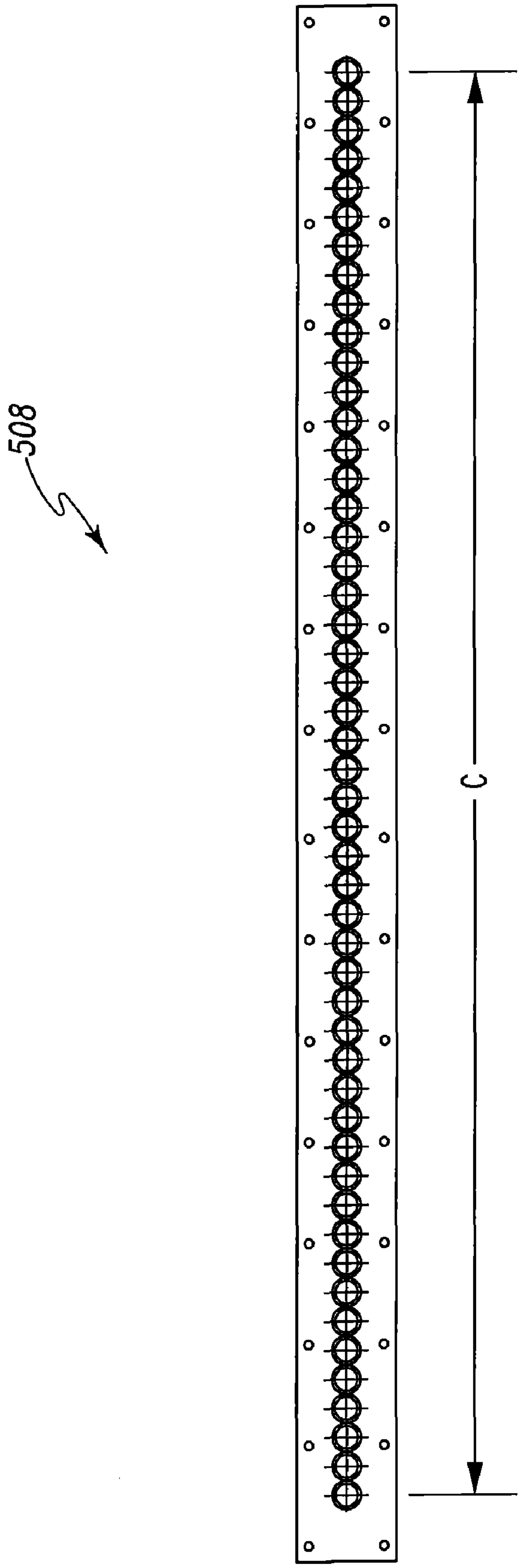
FIG. 5 is a faceplate for the loudspeaker enclosure of FIG. 4.

The center-to-center spacing of the speaker drivers 402-500 may be 2.12 cm, as shown in FIG. 5. The angle of the speaker array may be 60°, the same as that of the first loudspeaker enclosure 100. The angle of the speaker array may extend beyond the outermost speaker drivers 402 and 500, so that their position is within the arc of the speaker array, in the same manner as explained above for the first loudspeaker enclosure 100.

Using equation (3) above, with the actual values for the example loudspeaker enclosure 400, leads to the following quantized attenuation values for five sub-arrays of the speaker drivers 402-500. A first sub-array may comprise the speaker drivers 434-468, and may have no attenuation. Next, a second sub-array may comprise the speaker drivers 418-432 and 470-484, and may have −3 dB of attenuation. A third sub-array may comprise the speaker drivers 410-416 and 486-492 may have −6 dB of attenuation. A fourth sub-array may comprise the speaker drivers 406-408 and 494-496, and may have −9 dB of attenuation. Finally, a fifth sub-array may comprise the speaker drivers 402-406 and 498-500, and may have −12 dB of attenuation.

Figure 6:
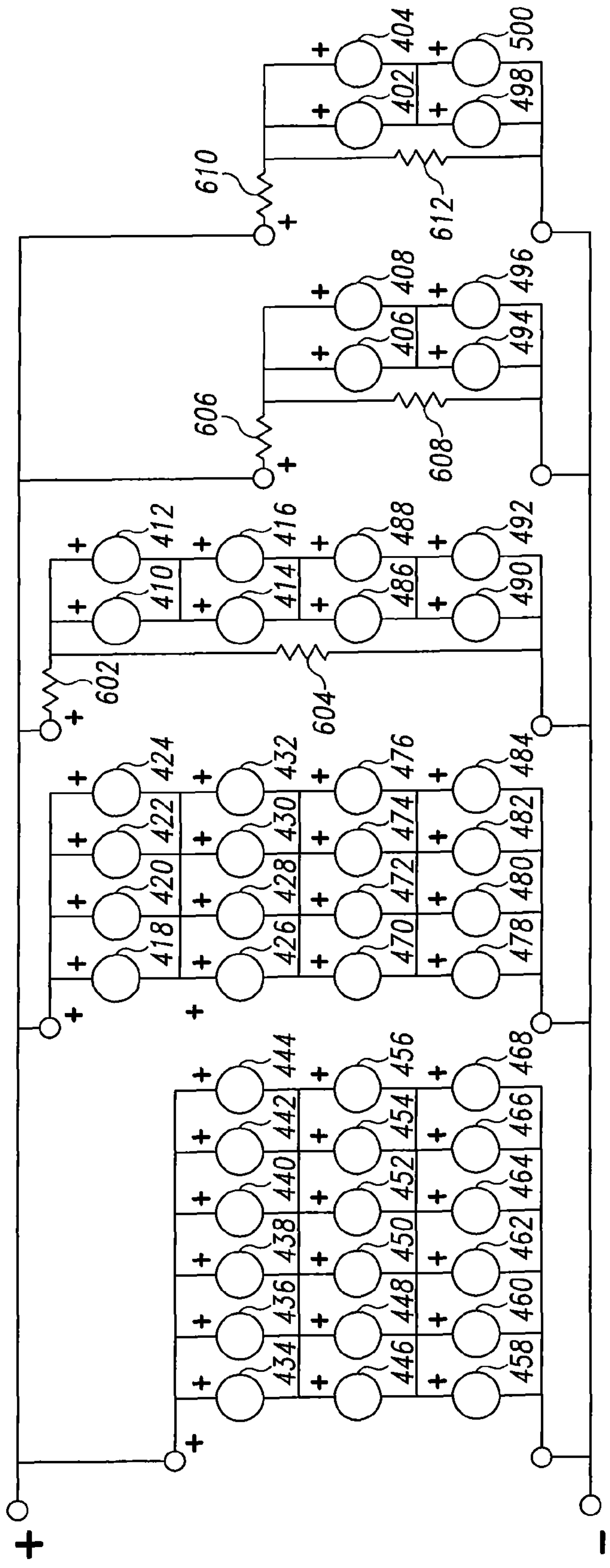
FIG. 6 is a schematic for the loudspeaker enclosure of FIG. 4.

An example schematic diagram is shown in FIG. 6 that provides approximate attenuation levels for the speaker drivers 402-500. For constant-beamwidth operation, relative attenuation of each of the speaker drivers 402-500 is relevant, so the example schematic diagram maintains the relative levels described in the previous paragraph. For the example configuration shown in FIG. 6, the impedance of each of the speaker drivers 402-500 may be about 4.0 Ohms.

The speaker drivers 434-468 may be arranged such that their attenuation is about −9.5 dB. Likewise, the speaker drivers 418-432 and 470-484 may be arranged such that their attenuation is about −12 dB. Coupling a first resistor 602 having a resistance of about 2.0 Ohms resistor and a second resistor 604 having a resistance of about 11.0 Ohms with the speaker drivers 410-416 and 486-492 results in about −15 dB of attenuation for the combination. Similarly, at third resistor 606 having a resistance of about 4.0 Ohms and a fourth resistor 608 having a resistance of about 2.0 Ohms may be coupled with the speaker drivers 406-408 and 494-496 to result in about −15 dB of attenuation.

Finally, 402-406 and 498-500 may be coupled with a fifth resistor 610 having a resistance of about 3.9 Ohms and a sixth resistor 612 having a resistance of about 1.0 Ohm for about −21 dB of attenuation. Each of the speaker drivers 402-500 may have an absolute attenuation that is about 9.0 dB below the determined quantized attenuation values, so that the relative attenuation levels are maintained. As with the loudspeaker enclosure 100, other methods may be used to implement the attenuation of the loudspeaker enclosure 400.

FIG. 7 is a front view of the first loudspeaker enclosure 100, the second loudspeaker enclosure 400, and a third example loudspeaker enclosure 700. As shown in FIG. 7, the width of the loudspeaker enclosures 100 and 400 may be wide enough to accommodate the respective faceplates 138 and 508. Alternatively, the loudspeaker enclosures 100 and 400 may be wider. Also shown in FIG. 7 is a third loudspeaker enclosure 700 that may accommodate mounting both of the faceplates 138 and 508 simultaneously.

The third loudspeaker enclosure 700 may facilitate constant-beamwidth operation over a wider frequency range then either of the loudspeaker enclosures 100 or 400. In a theoretically ideal constant-beamwidth loudspeaker array described by equations (1) through (4), each speaker driver is a point source capable of generating acoustic waves of any frequency and amplitude. In the actual array, however, the response of a speaker driver is limited by the mass of air that the speaker driver is capable of moving, which is a function of the surface area of the speaker driver's cone. Thus, the larger the diameter of a speaker driver, the better able the speaker driver is to reproduce low frequency sound waves. Larger diameter speaker drivers, however, must be spaced farther apart (center-to-center spacing), and therefore have a lower theoretical upper-operational frequency than smaller speaker drivers. The loudspeaker enclosure 700 utilizes two speaker arrays to avoid the reduced constant-beamwidth frequency operational range.

The loudspeaker enclosure 700 may use crossover circuitry so that higher frequencies are handled by the smaller speaker drivers 402-500, and lower frequencies are handled by the larger speaker drivers 102-136. Alternatively, speaker drivers of the two speaker arrays that have the same amount of attenuation may be wired together. For example, the five sub-arrays of each speaker array may be driven by five amplifiers, where each amplifier provides the appropriate attenuation. Furthermore, the concept of using multiple speaker arrays in a single loudspeaker enclosure may be extended by adding more rows (arrays) of speaker drivers. For example, a speaker array providing sound reinforcement for a stadium sized venue may be several feet tall and include a speaker array of 305.0 mm speaker drivers, a speaker array of 101.6 mm speaker drivers, and a speaker array of 25.4 mm speaker drivers.

Figure 8:
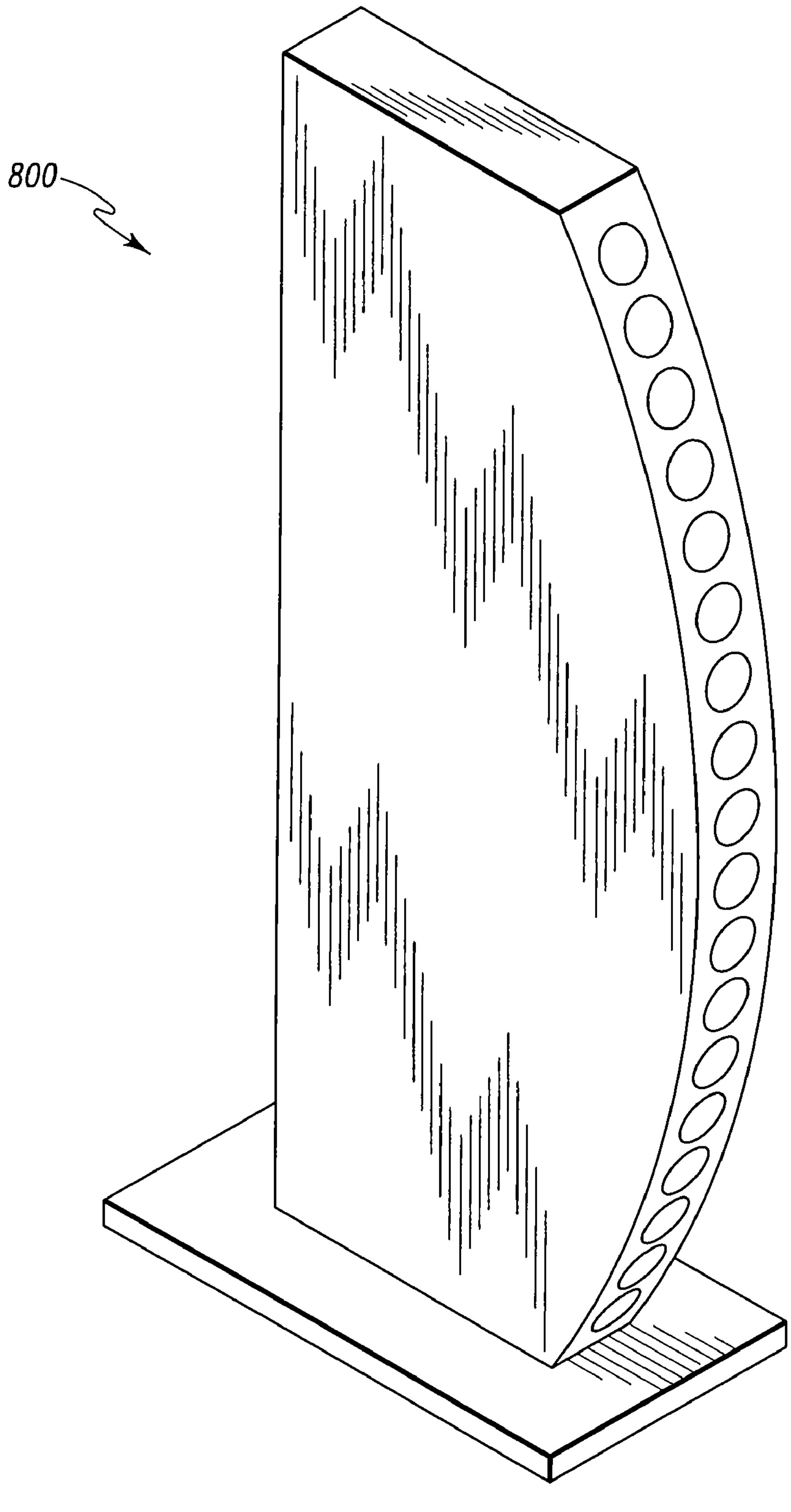
FIG. 8 is a perspective view of the loudspeaker enclosure of FIG. 1.
Figure 9:
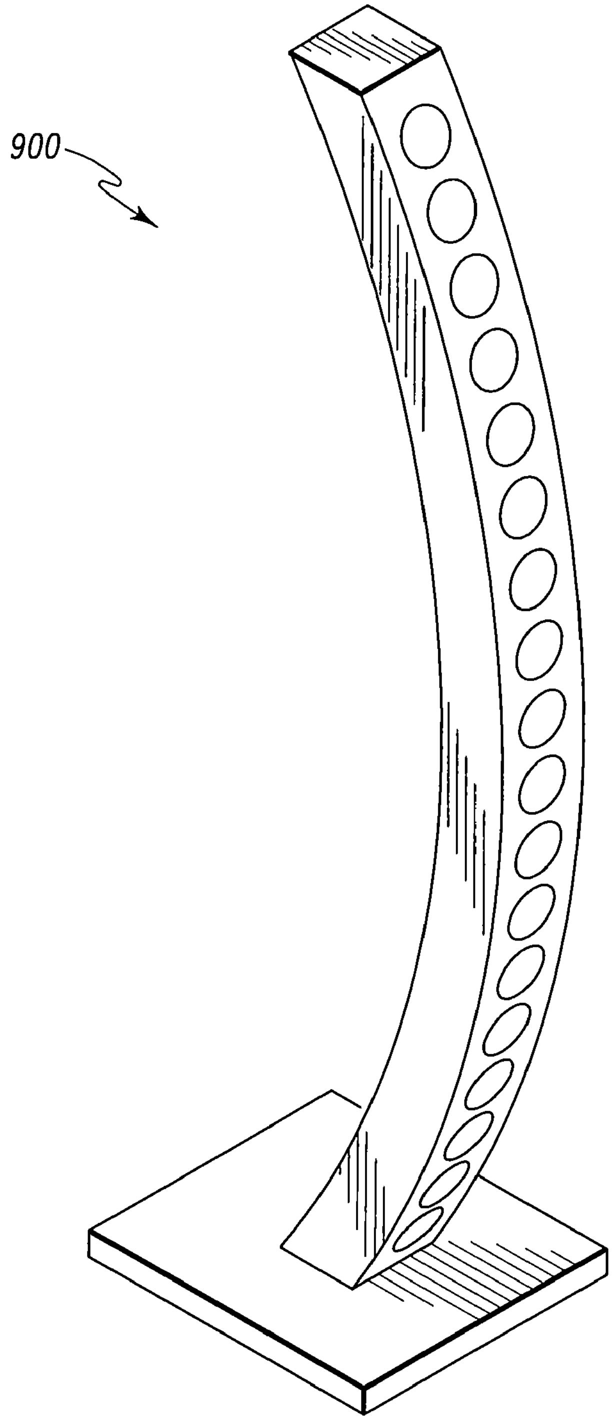
FIG. 9 is a perspective view of a fourth loudspeaker enclosure.

FIG. 8 is a perspective view of the first loudspeaker enclosure 100 mounted to a base plate. FIG. 9 is an alternative configuration for a fourth loudspeaker enclosure 900. The fourth loudspeaker enclosure 900 may be similar to the first loudspeaker enclosure 100 except for the configuration of the sides and the back. The interior volume (air space) of the loudspeaker enclosure 900 may be large enough to prevent dampening of the speaker drivers 102-136. Therefore, the back of the enclosure 900 maybe curved as shown without affecting its constant-beamwidth characteristics. Other configurations for a loudspeaker enclosure may also be implemented, for example, the back of an enclosure may be curved convexly to form an eye-shaped profile.

Figure 10:
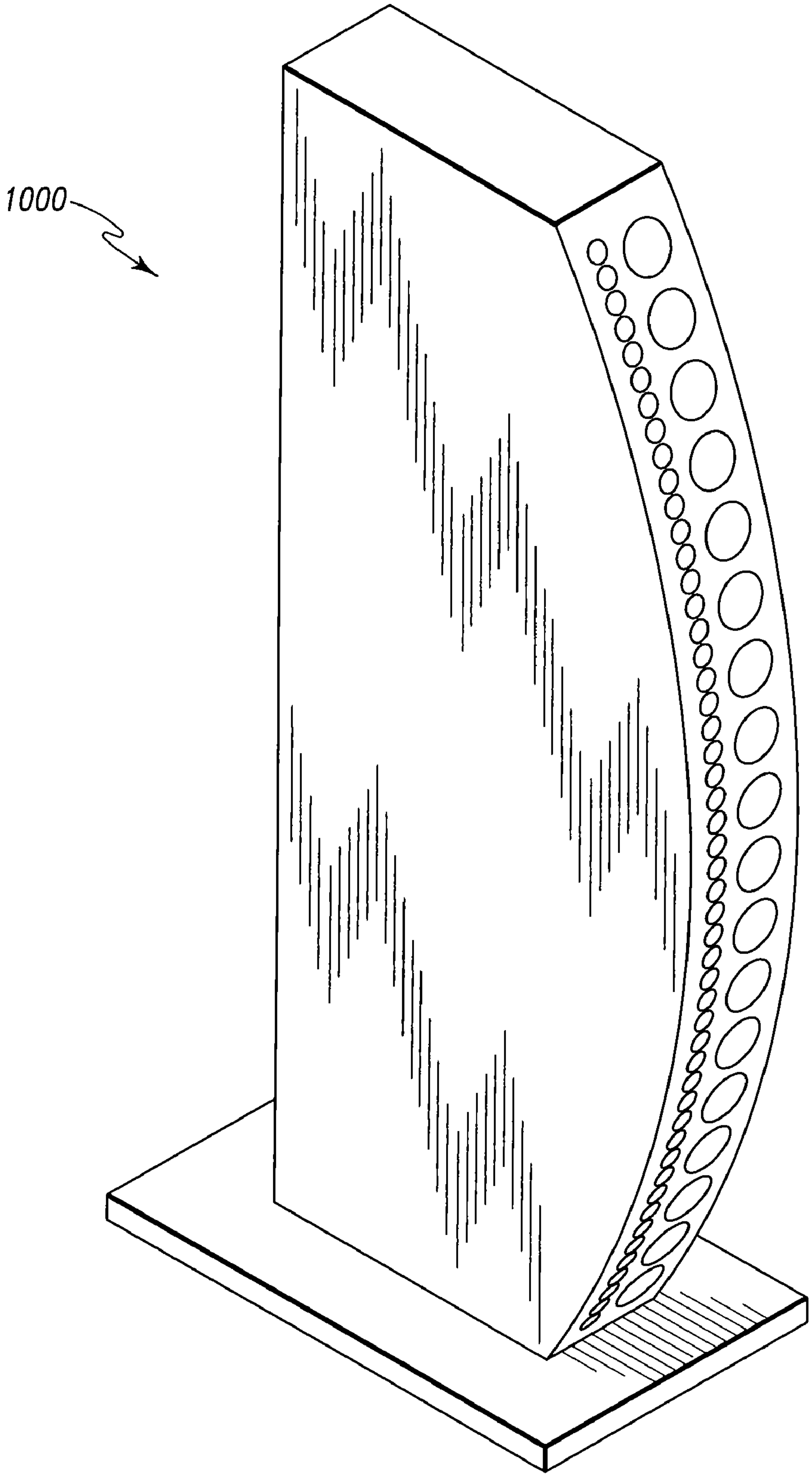
FIG. 10 is a perspective view of the third loudspeaker enclosure of FIG. 7.

FIG. 10 is a perspective view of the third loudspeaker enclosure 700 mounted to a base plate. The third loudspeaker enclosure 700 may also be configured in similar manner to that of the fourth loudspeaker enclosure 900. Again, the interior volume of the loudspeaker enclosure 900 may be large enough to prevent dampening of the speaker drivers 102-136 and 502-500.

Constant-Beamwidth Speaker Array Performance

The constant-beamwidth performance of the example first loudspeaker enclosure 100 will now be described. As mentioned above, the loudspeaker enclosure 100 may be about 1.0 m high and may have a constant-beamwidth operational angle of about 45°. Therefore, using equation (4) with θ=45°, and X=1.0 m, the calculated lower-operational frequency for constant-beamwidth performance may be about 555 Hz. This constant-beamwidth operational frequency should not be confused with the low frequency response of the loudspeaker enclosure 100, which is approximately equal to the frequency response of the individual speaker drivers 102-136, or about 100 Hz. The theoretical upper-operational frequency of the loudspeaker enclosure 100 for constant-beamwidth performance may be equal to the speed of sound (34,290 cm/second) divided by the center-to-center spacing of the speaker drivers 102-136 (59.0 mm), or approximately 5.8 kHz.

FIGS. 11-19 compare the calculated normalized vertical polar responses of the loudspeaker enclosure 100 to experimental normalized measured responses of the loudspeaker enclosure 100 at various frequencies. All vertical polar response graphs contained herein are oriented such that the X axis (180° to 0°) runs through the center of the loudspeaker enclosure 100 from back to front, and the Y axis (90° to −90°) runs vertically through speaker drivers 102 and 136. The calculated normalized vertical polar responses were generated using unbaffled "point sources", and then the "back half" (90° to 270°) of the graphs was removed.

Figure 11:
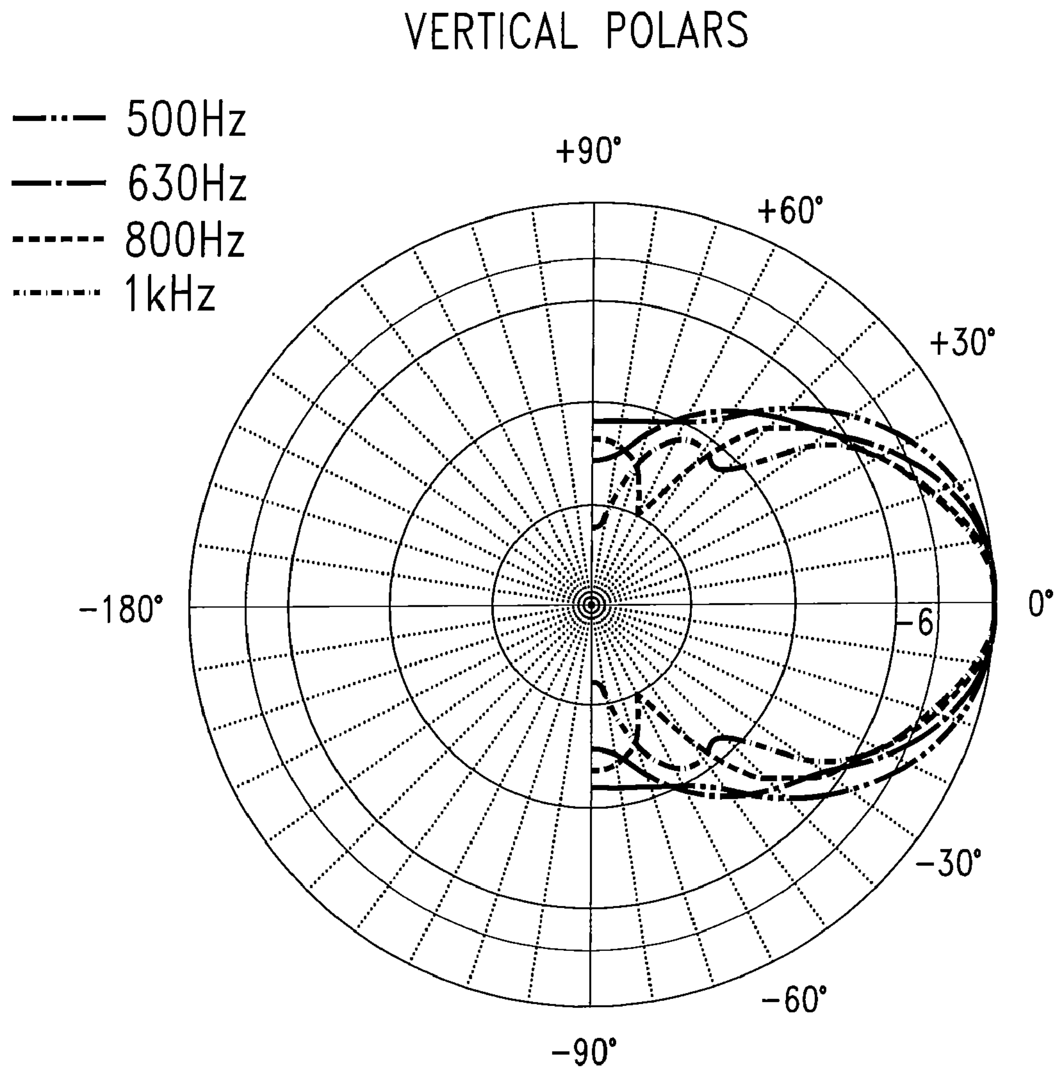
FIG. 11 is a polar graph of a theoretical vertical beamwidth of a sonic beam produced by the loudspeaker enclosure of FIG. 1 for frequencies between 500 Hz and 1 kHz.
Figure 12:
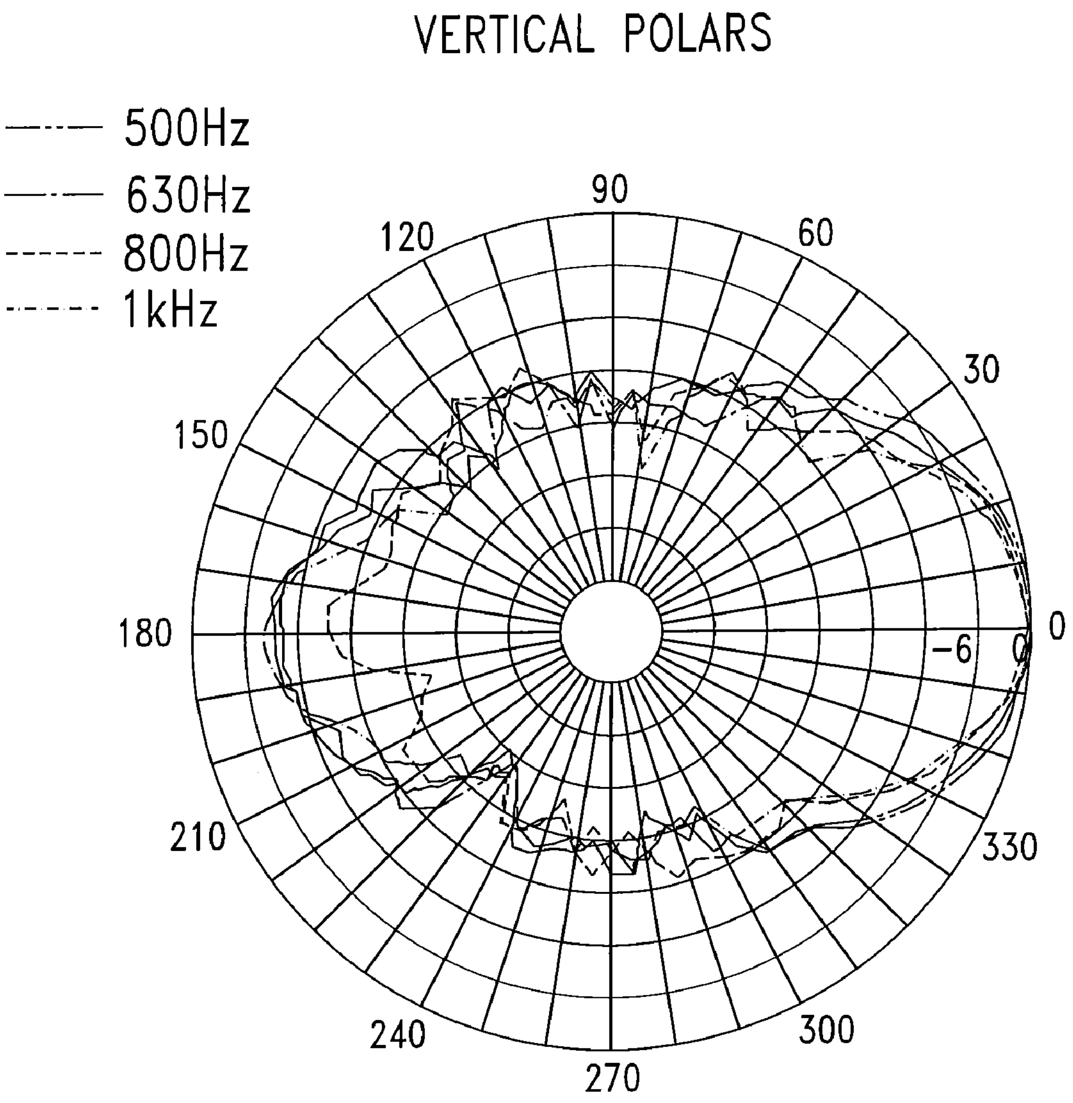
FIG. 12 is a polar graph of an actual vertical beamwidth of a sonic beam produced by the loudspeaker enclosure of FIG. 1 for frequencies between 500 Hz and 1.00 kHz.

FIG. 11 is a graph of the calculated vertical polar response of the loudspeaker enclosure 100 for the frequencies of 500 Hz, 630 Hz, 800 Hz, and 1 kHz. As shown in FIG. 12, the experimental measured response of the loudspeaker enclosure 100 for these frequencies is about equal to the calculated response. In both graphs, the responses are "well behaved", having a beamwidth that narrows from about 60° at 500 Hz to about 42° at 1 kHz.

Figure 13:
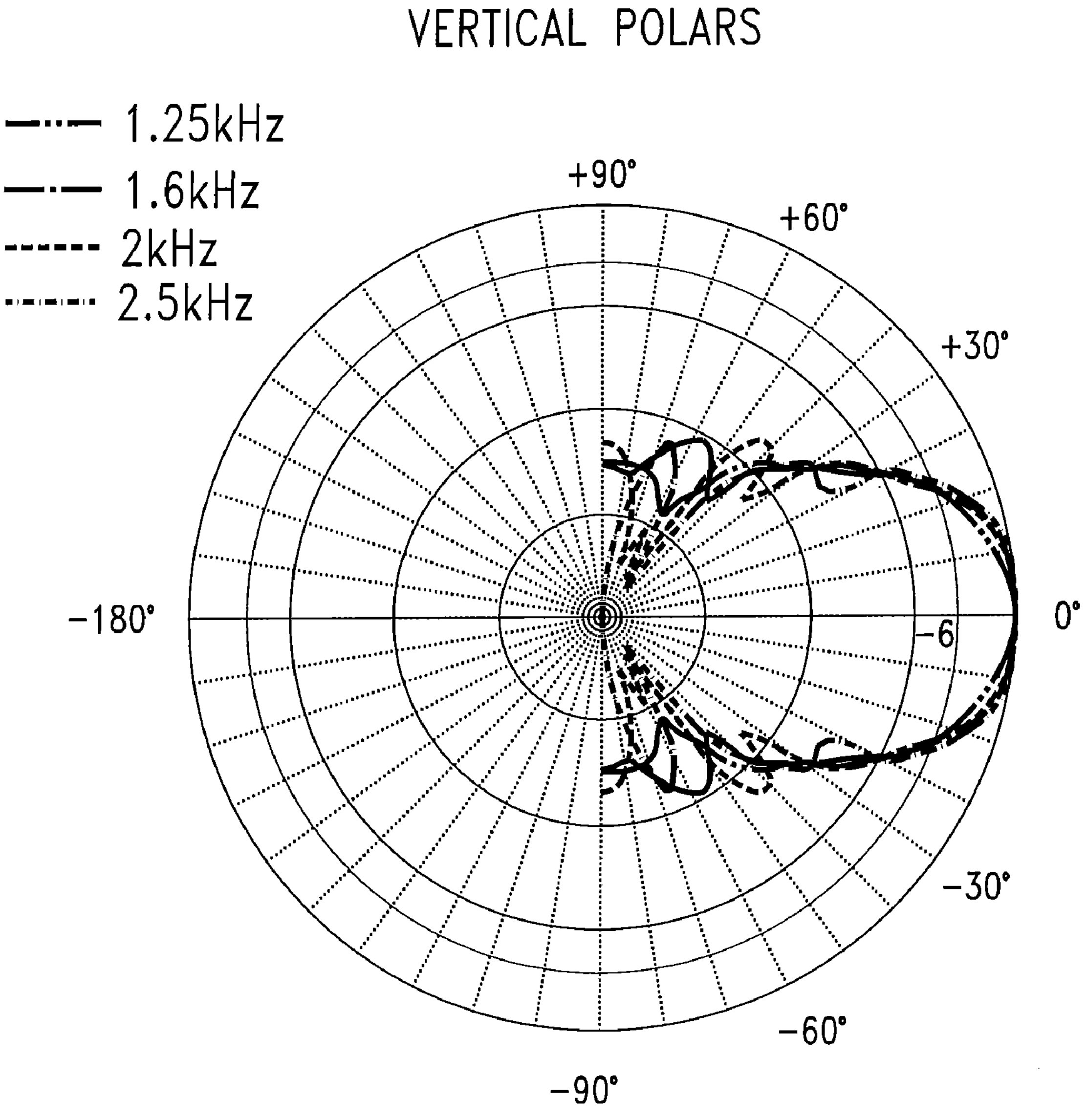
FIG. 13 is a polar graph of a theoretical vertical beamwidth of a sonic beam produced by the loudspeaker enclosure of FIG. 1 for frequencies between 1.25 kHz and 2.5 kHz.
Figure 14:
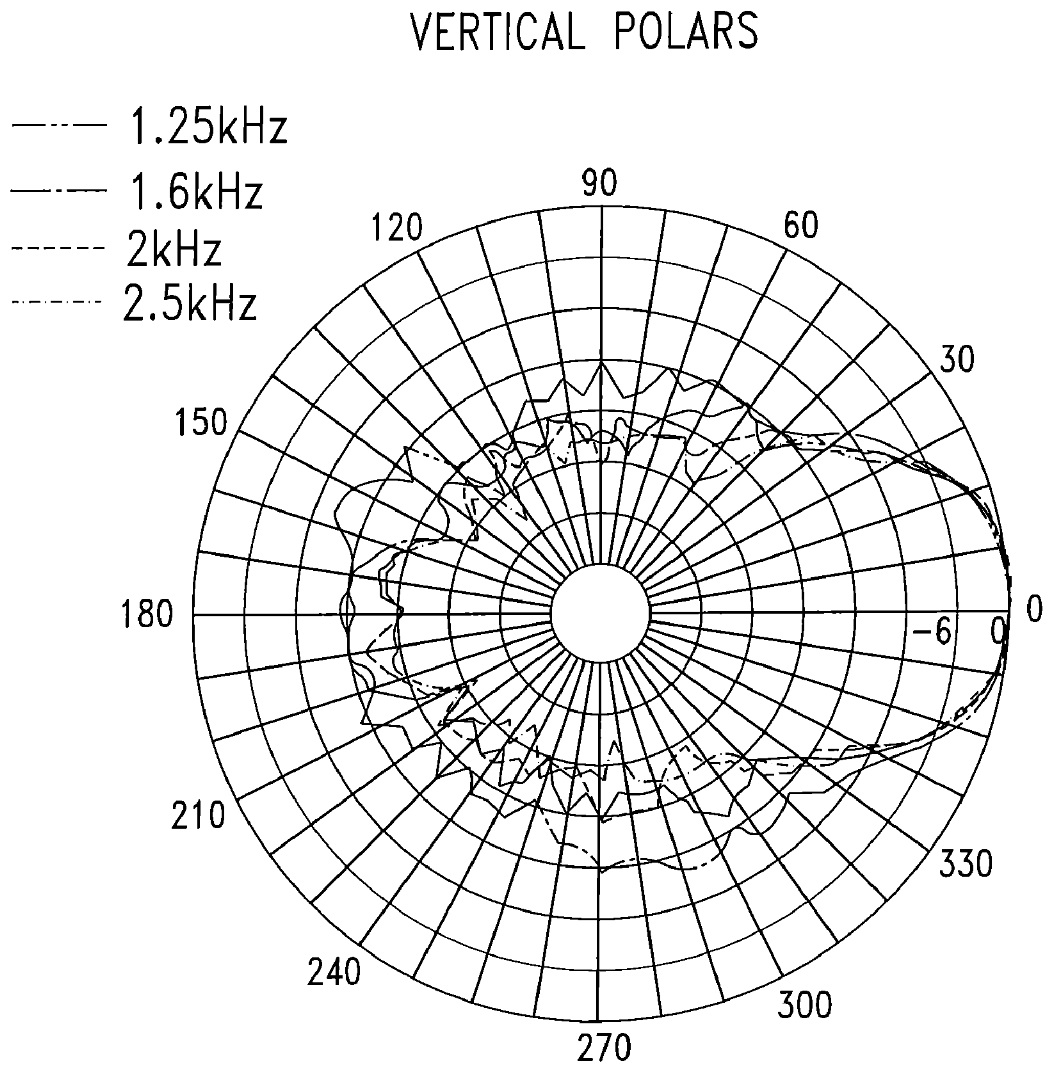
FIG. 14 is a polar graph of an actual vertical beamwidth of a sonic beam produced by the loudspeaker enclosure of FIG. 1 for frequencies between 1.25 kHz and 2.5 kHz.

FIG. 13 is a graph of the calculated vertical polar response of the loudspeaker enclosure 100 for the frequencies of 1.25 kHz, 1.6 kHz, 2 kHz, and 2.5 kHz. As shown in FIG. 14, however, for the experimental measured response the beamwidth varies only slightly around 45°.

Figure 15:
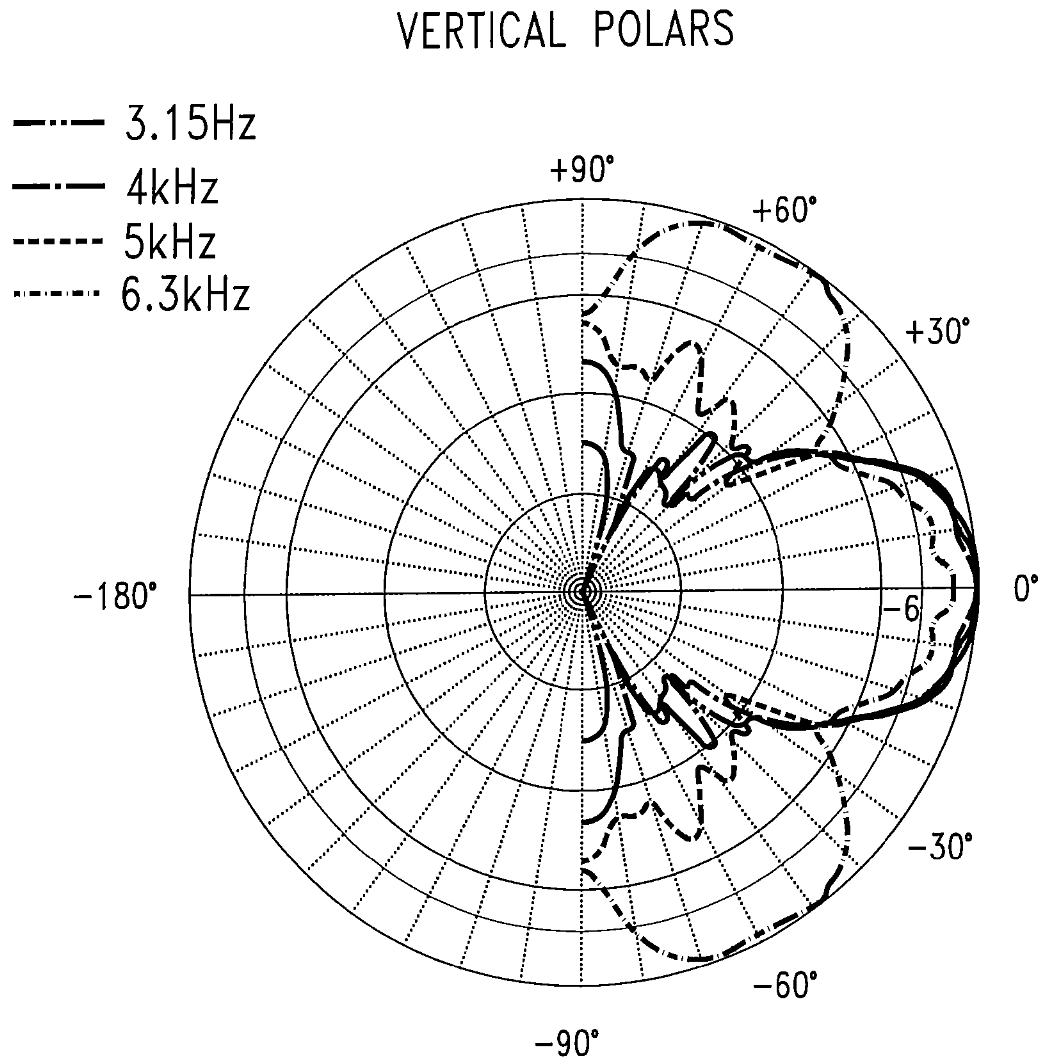
FIG. 15 is a polar graph of a theoretical vertical beamwidth of a sonic beam produced by the loudspeaker enclosure of FIG. 1 for frequencies between 3.15 kHz and 6.30 kHz.
Figure 16:
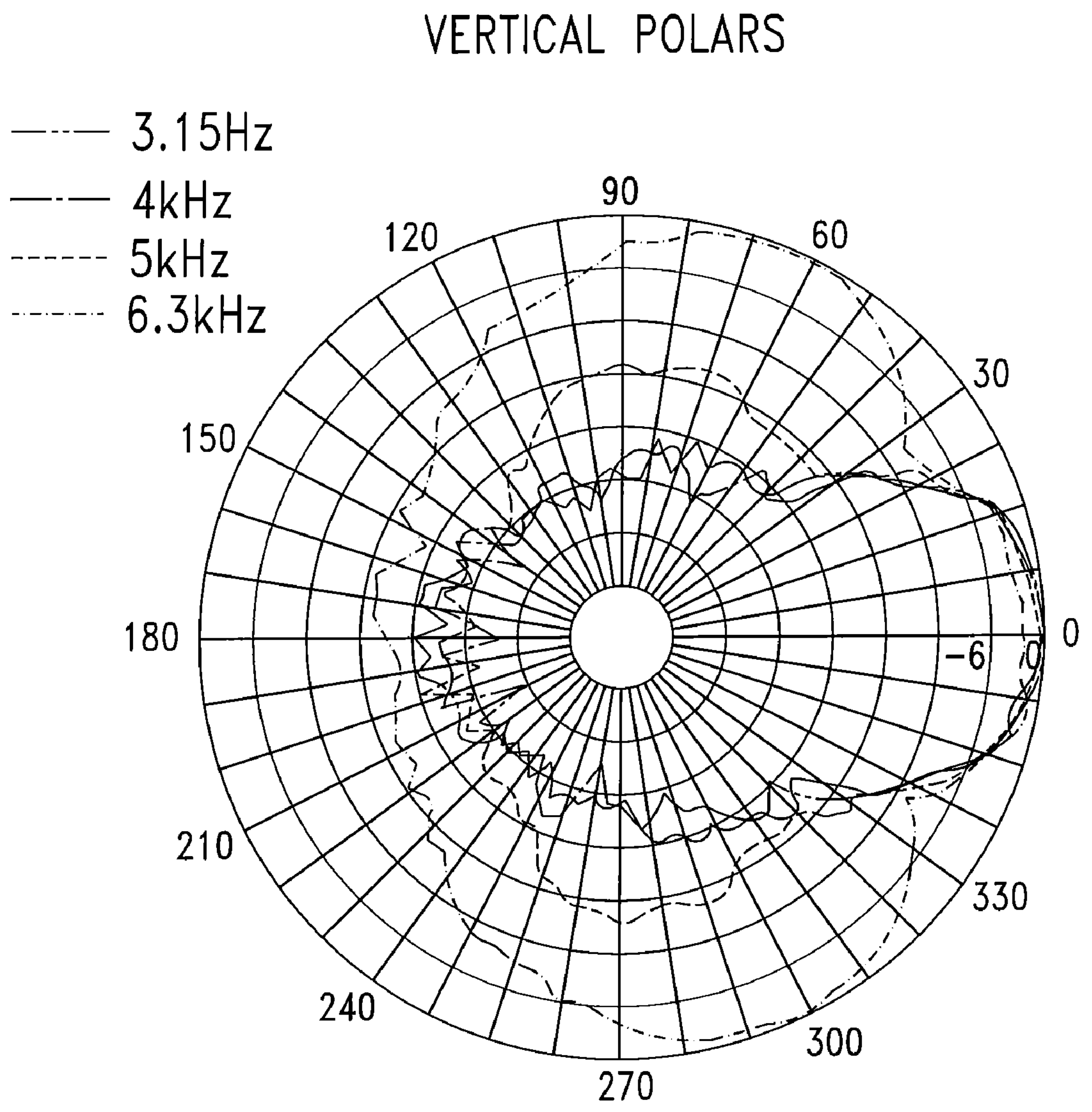
FIG. 16 is a polar graph of an actual vertical beamwidth of a sonic beam produced by the loudspeaker enclosure of FIG. 1 for frequencies between 3.15 kHz and 6.30 kHz.

FIG. 15 shows the calculated vertical polar response for the frequencies of 3.15 kHz, 4 kHz, 5 kHz, and 6.3 kHz, the last of which is above the calculated upper-operational frequency. The experimental measured response is shown in FIG. 16. Between 3.15 kHz to 5 kHz, FIGS. 15 and 16 are similar and perform well, except for growing off-axis lobes. At 6.3 kHz, however, both the calculated and measured responses exhibit major off-axis lobes at about +60° and −60°. These off-axis lobes may limit the constant-beamwidth operational frequency range to 5 kHz and below.

Figure 17:
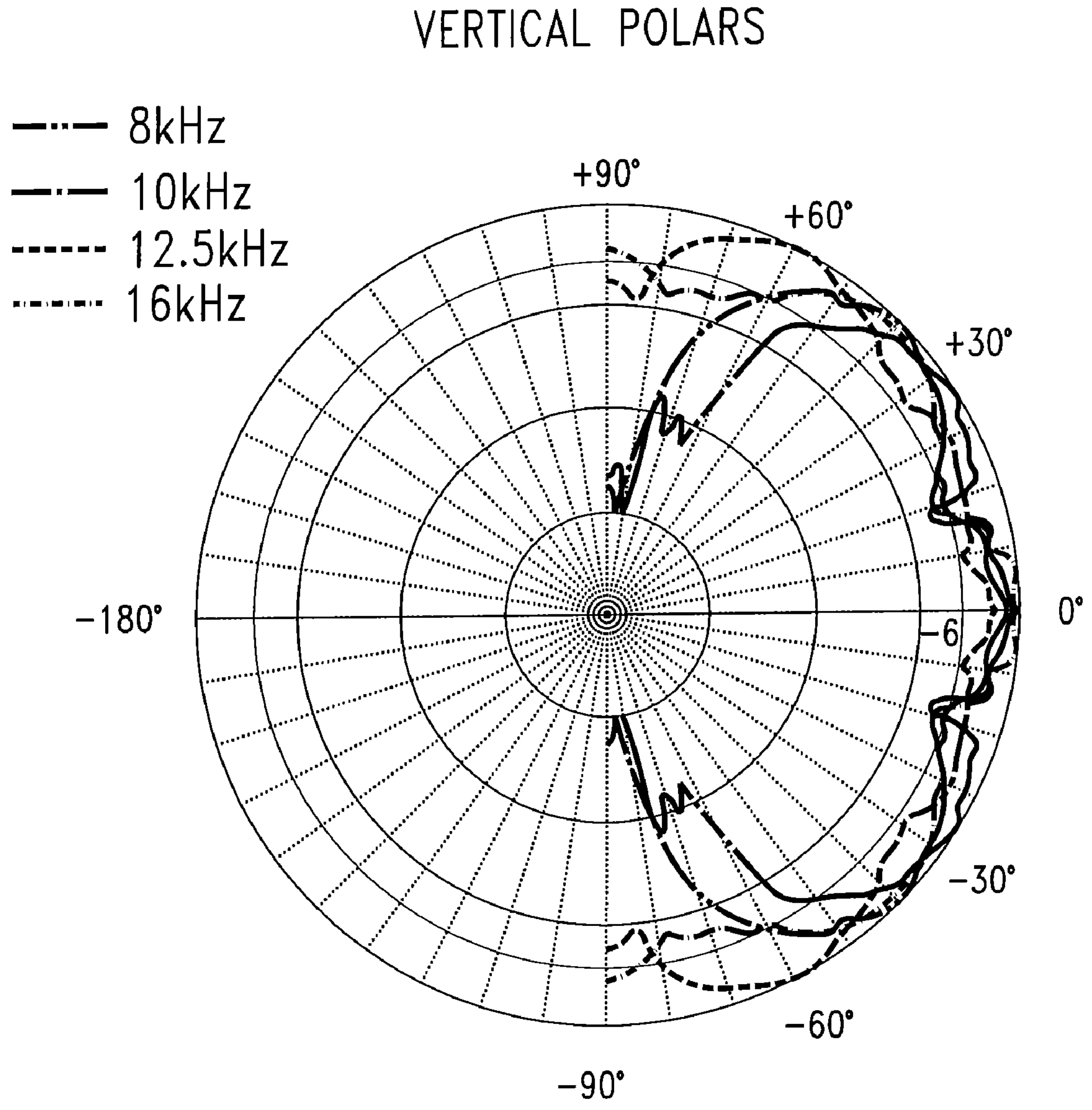
FIG. 17 is a polar graph of a theoretical vertical beamwidth of a sonic beam produced by the loudspeaker enclosure of FIG. 1 for frequencies between 8.00 kHz and 16.0 kHz.
Figure 18:
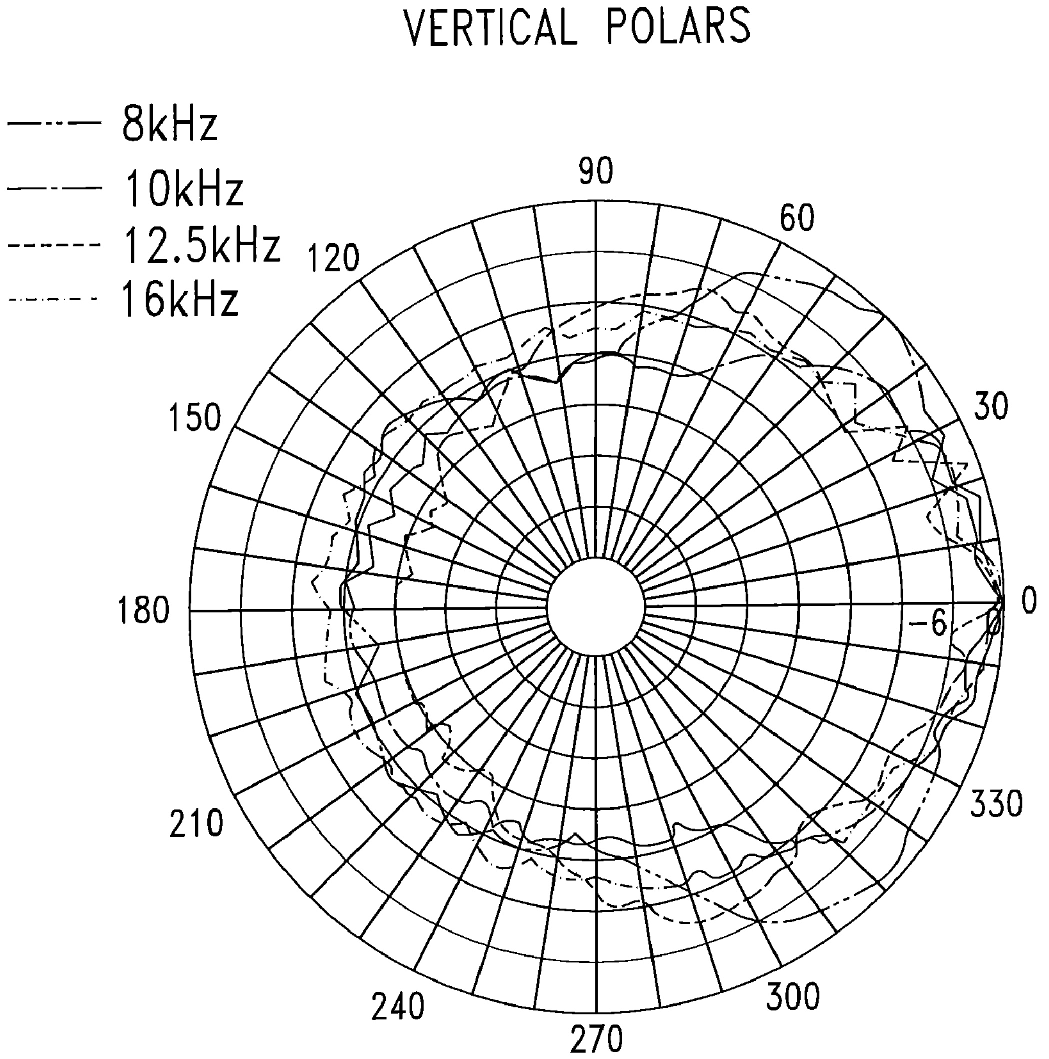
FIG. 18 is a polar graph of an actual vertical beamwidth of a sonic beam produced by the loudspeaker enclosure of FIG. 1 for frequencies between 8.00 kHz and 16.0 kHz.

As shown in FIGS. 17 and 18, the calculated and the experimental measured responses are essentially chaotic above 8 kHz, and the coverage angle is very wide. These frequencies are above the constant-beamwidth operational range of the array, which is approximately 5.8 kHz, as noted above.

Figure 19:
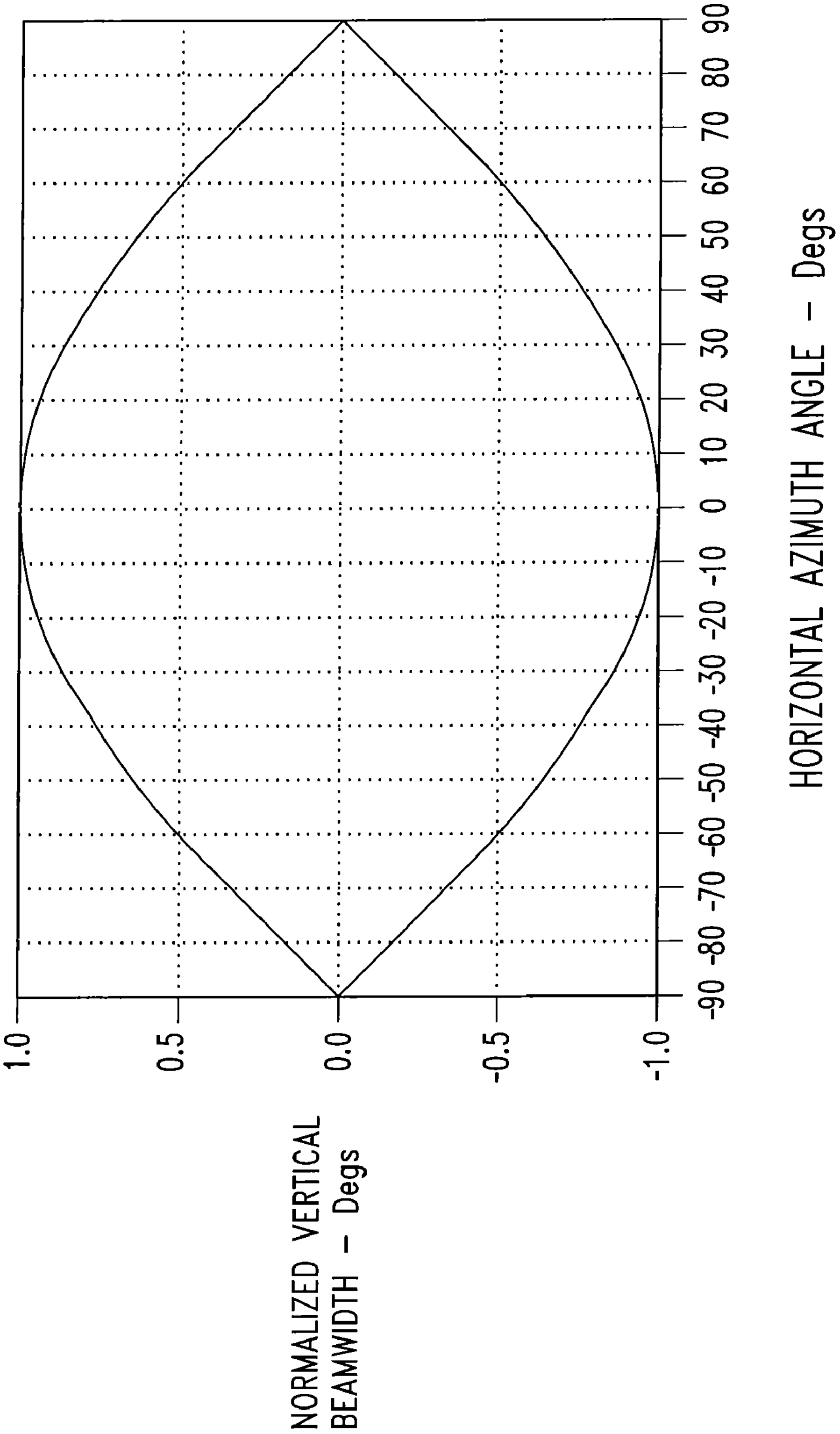
FIG. 19 is a graph showing the theoretical normalized vertical beamwidth of a sonic beam produced by the loudspeaker enclosure of FIG. 1 as a function of a horizontal azimuth angle of the sonic beam.

The discussions above regarding FIGS. 11-18 describe control of the vertical aspect of the beamwidth of a circular-wedge linear constant-beamwidth transducer speaker array that is vertically oriented. As shown in the calculated results of FIG. 19, however, the circular-wedge linear constant-beamwidth transducer speaker array of loudspeaker enclosure 100 may also control a horizontal beamwidth. FIG. 19 is a graph of a normalized frontal beam shape for the loudspeaker enclosure 100. The graph shows that the vertical beamwidth changes as a function of a horizontal azimuth angle. The vertical beamwidth progressively narrows off-axis horizontally and approaches zero at +90° and −90°. The beamwidth is a function of the azimuth angle, as follows:

$$\phi=\phi_0\cos(a) \tag{7}$$

where:

$\phi$=vertical beamwidth at horizontal azimuth angle a $\phi_0$=maximum vertical beamwidth at a=0° (beamwidth at 0° azimuth)

The narrowing vertical beamwidth at extreme off-axis horizontal angles may result in a concentration of sound energy in front of the loudspeaker enclosure 100.

As previously discussed, the experimental measured constant-beamwidth performance of the example second loudspeaker enclosure 400 is close to the calculated constant-beamwidth performance. This is because the calculated upper-operational frequency of the loudspeaker enclosure 400 is 16 kHz, the highest frequency analyzed. Furthermore, the low frequency response of the speaker drivers 402-500 is 500 Hz, roughly equal to the calculated lower-operational frequency of 555 Hz. The experimental measured constant-beamwidth performance of the example third loudspeaker enclosure 700 is better than that of either loudspeaker enclosure 100 or 400, as predicted by the calculations.

Straight Line, Curved-Surface, and Flat Constant-Beamwidth Speaker Arrays

In the first example loudspeaker enclosure 100, the speaker drivers 102-136 are positioned around an arc or on a spherical surface. Alternatively, the speaker drivers 102-136 may be positioned on a toroidal surface. Spatial positioning on the surface may be used with Legendre attenuation to achieve constant-beamwidth characteristics for the speaker array. As an alternate to physical spatial positioning in a toroid or an arc, signal delays may be used to approximate delays in acoustic waves that are generated by a straight-line or "flat" array of speaker drivers. A signal delay may effectively "move" a speaker driver from its position on a straight line or flat surface to, for example, a point on a circular arc or on the surface of a sphere.

Figure 20:
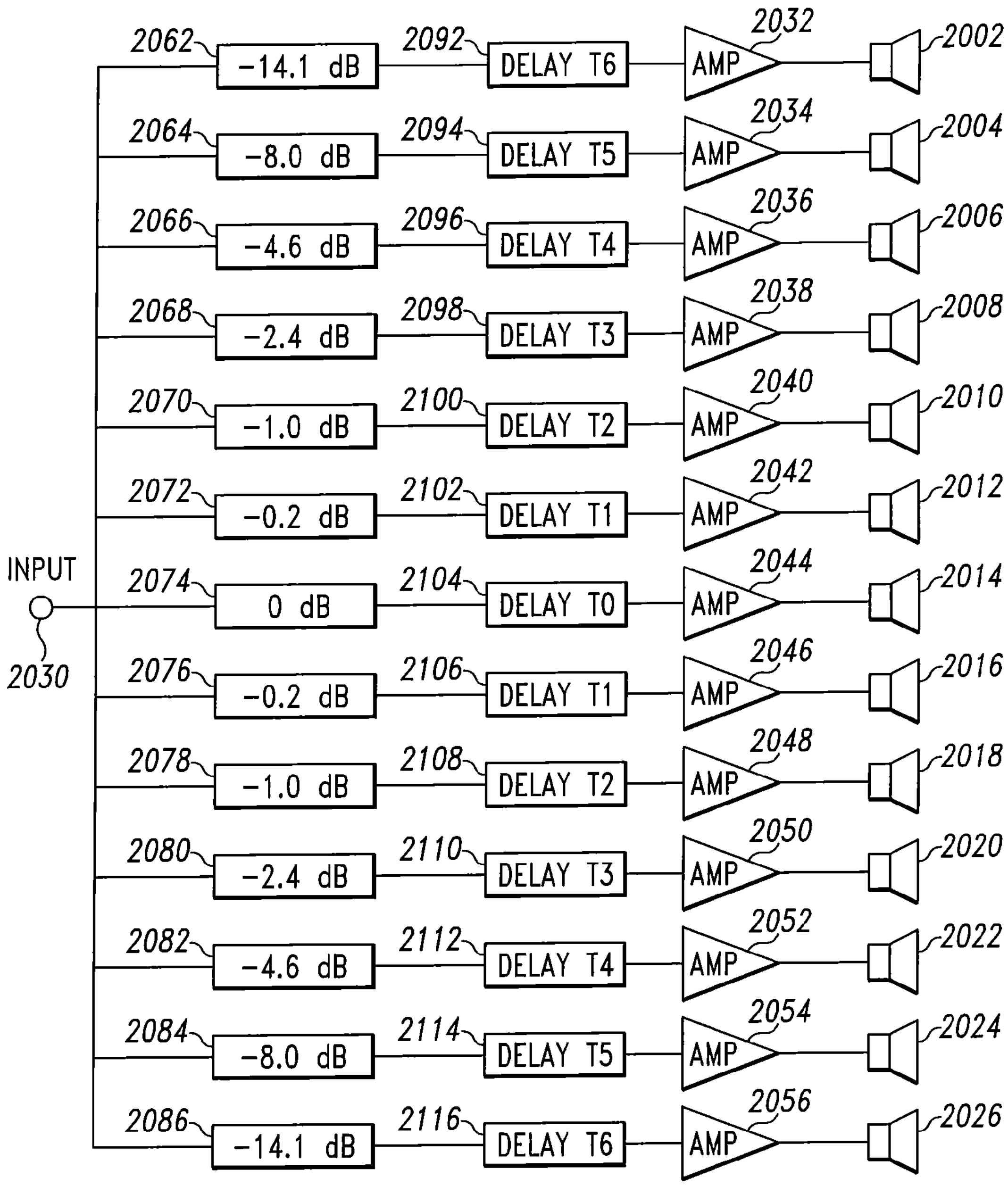
FIG. 20 is a schematic for a straight-line speaker array.

FIG. 20 is a schematic for a straight-line speaker array 2000, which may use signal processing to create signal delays. Each speaker driver 2002-2026 may be driven by a separate amplifier 2032-2056, respectively. An input signal 2030 may be attenuated by attenuation blocks 2062-2086, each of which may provide the necessary Legendre attenuation. The attenuation for each speaker driver 2002-2026 may be calculated using equation (1) or (3), above. A signal delay (phase delay) of time (Tx) for each speaker driver 2002-2026 may be provided by delay blocks 2092-2116. Each delay block may include, for example, digital signal processing or analog delay circuitry.

Figure 21:
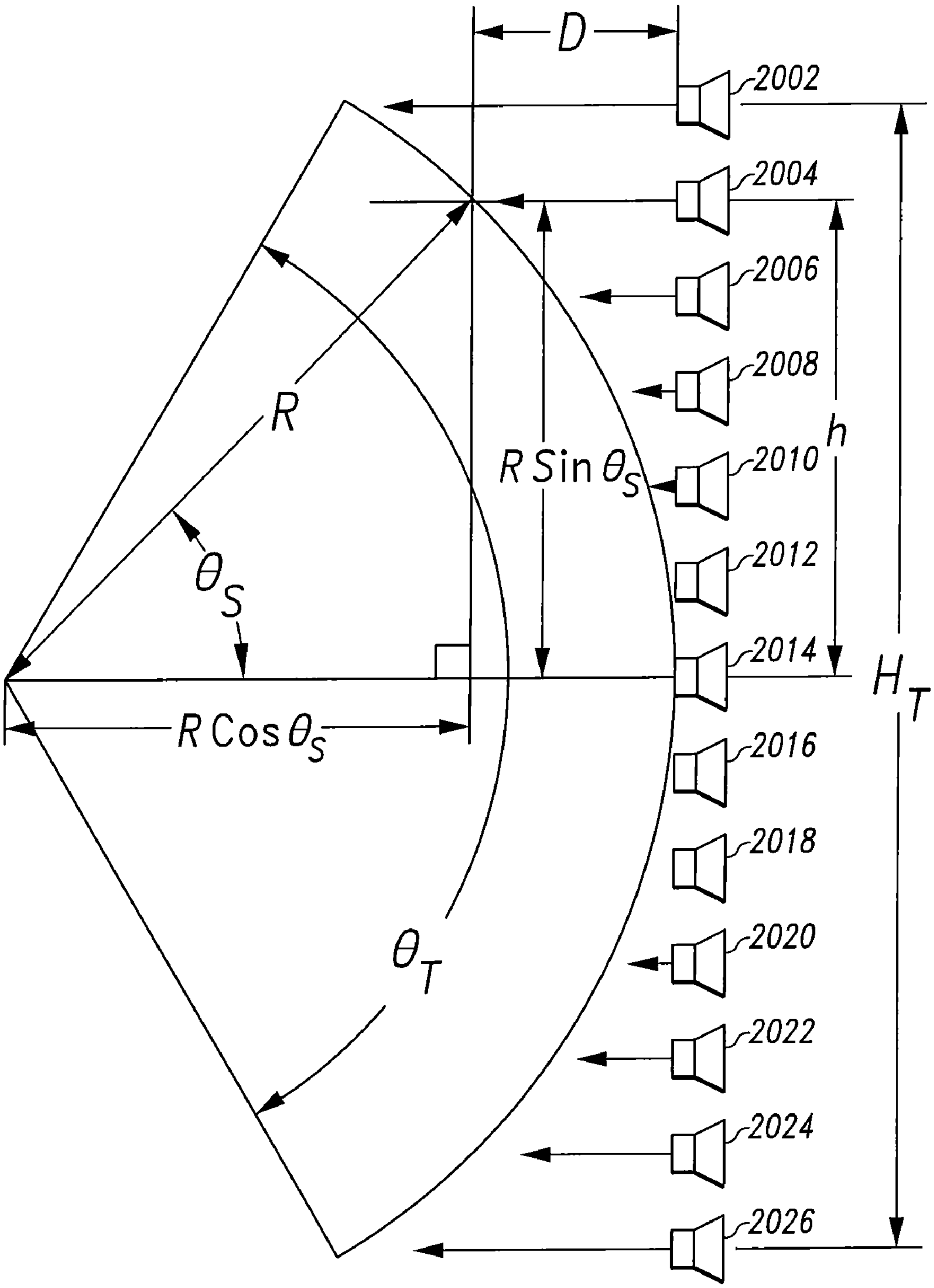
FIG. 21 is a diagram showing actual and virtual locations for speaker drivers in the straight-line speaker array of FIG. 20.

Referring to FIG. 21, each time ($T_x$) may be calculated as follows. The speaker drivers 2002-2026 may be equally spaced along an axis of the straight-line speaker array, as shown. In this example, the signal delays ($T_x$) may virtually shift the speaker drivers 2002-2026 straight back from their position on the straight line axis of the speaker array to a point on a virtual arc of radius (R). This example method may essentially start with the speaker drivers 2002-2026 equally spaced in a straight line and transfer them back to the virtual arc, so that the speaker drivers 2002-2026 may be unequally spaced on the arc.

An alternate calculation method, which is not examined here, may be to start with the speaker drivers 2002-2026 equally-spaced around the virtual arc, and then shift them forward to the straight line. This alternative method, however, may lead to unequal spacing of the speaker drivers 2002-2026 on the straight line. It may be desirable to place the speaker drivers 2002-2026 as close together as possible, so that the edges of the speaker drivers 2002-2026 may be nearly or actually touching each other.

The radius (R) of the virtual arc is given by:

$$R = \frac{H_T}{2\sin\left(\frac{\theta_T}{2}\right)} \tag{8}$$

where:

R=radius of virtual arc, $H_T$=overall height of arc, and $\theta_T$=included angle of arc.

The angular position of a specific speaker driver 2002-2026 on the virtual arc is given by:

$$\theta_S = \sin^{-1}\left(\frac{h}{R}\right) \tag{9}$$

where:

$\theta_S$=speaker driver angle, and h=speaker driver height.

The required offset (D) to position each specific speaker driver 2002-2026 on the arc is given by:

$$D=R(1-\cos\theta_S) \tag{10}$$

where:

D=speaker driver offset.

The signal delay of time ($T_x$) for each speaker driver 2002-2026 to be provided by each delay block 2092-2116 is given by:

$$T_x=D/c \tag{11}$$

where:

$T_x$=offset delay, and c=speed of sound.

The straight-line speaker array 2000 may be constructed without the attenuation block 2074 and the delay block 2104, because the speaker driver 2014 may be calculated to have no attenuation and no signal delay. Furthermore, the straight-line speaker array 2000 may be constructed with only half of the remaining "channels". For example, the straight-line speaker array 2000 may be constructed using only the attenuation blocks 2032-2052, the delay blocks 2092-2102, and the amplifiers 2032-2042 to power the speaker drivers 2002-2026. This is because the speaker array may be symmetrical, so that one "channel" may power speaker drivers 2002 and 2026, another channel may power drivers 2004 and 2024, and so on. The acoustic output of the straight-line speaker array 2000, or any other speaker array using electronic signal delays, may be "steered" by changing the delay values to effectively tilt the speaker array in a desired direction.

Spherical-Cap and Flat Circular Constant-Beamwidth Speaker Arrays

Figure 22:
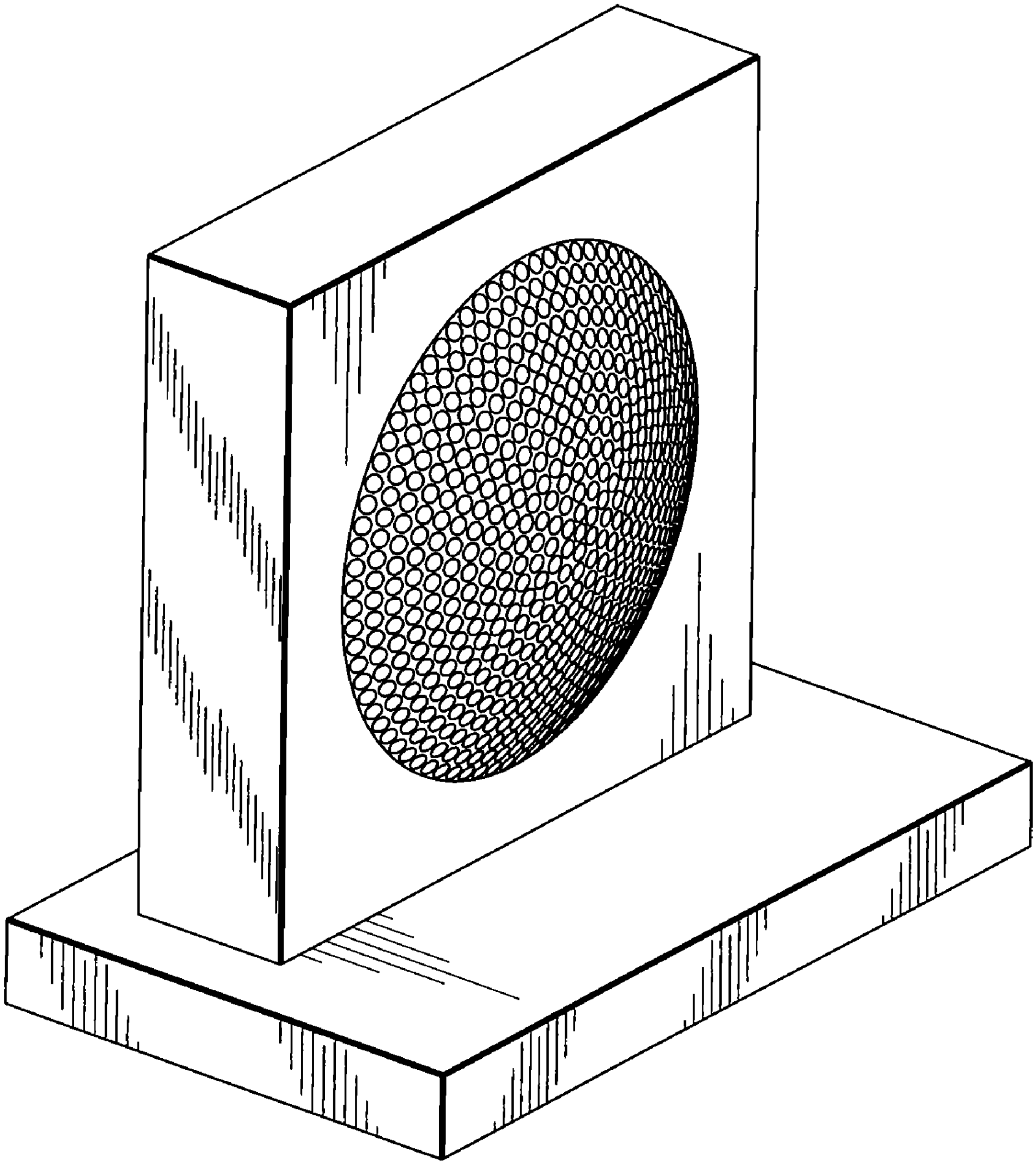
FIG. 22 is a perspective view of a loudspeaker enclosure for a spherical-cap two-dimensional speaker array.
Figure 23:
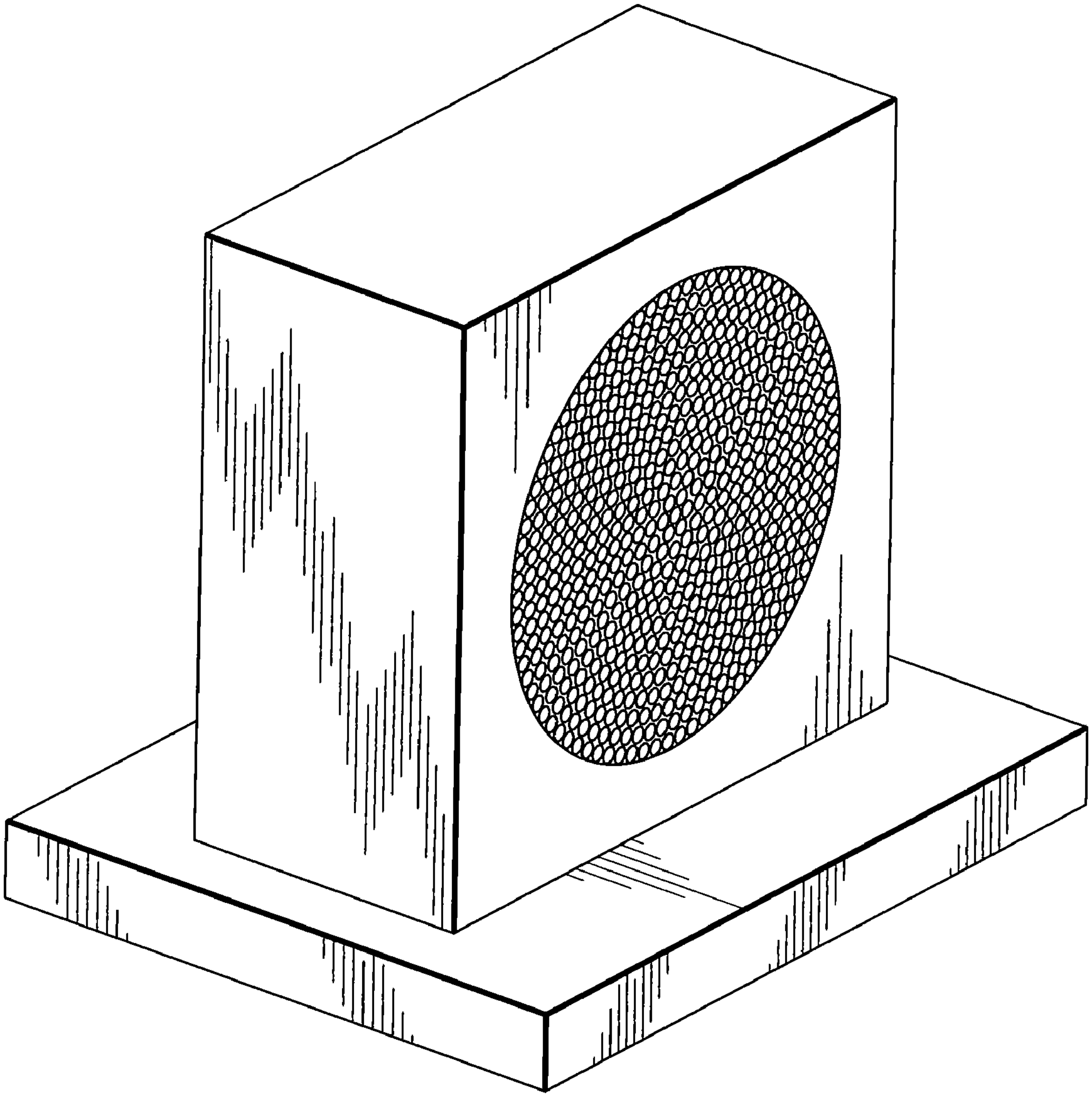
FIG. 23 is a perspective view of a loudspeaker enclosure for a circular-flat two-dimensional speaker array.

An example spherical-cap (two-dimensional array) loudspeaker enclosure 2200 is shown in FIG. 22. Alternatively, the two-dimensional loudspeaker enclosures 2200 may also be constructed having a toroidal curvature. An analogous flat-circular (two-dimensional array) loudspeaker enclosure 2300 is shown in FIG. 23. Each loudspeaker enclosure 2200 and 2300 includes a speaker array that is about 686.0 mm in diameter, which is approximately the length of two acoustic wavelengths for a frequency of 1 kHz. Each loudspeaker enclosure 2200 and 2300 may be adapted for about 36.4° coverage angle above a frequency of about 1 kHz, and have an arc angle of about 56.9°.

The spherical-cap enclosure 2200 may include 553 speaker drivers. The flat-circular loudspeaker enclosure 2300 may include 556 speaker drivers. For each loudspeaker enclosure 2200 and 2300, the speaker drivers may be spaced about 25.4 mm from center to center. This center-to-center spacing may provide constant-beamwidth operation to an upper-operational frequency of about 13.5 kHz. The loudspeaker enclosures 2200 and 2300 may each include a single speaker driver in the center of the speaker array, and thirteen radial rings spaced about 25.4 mm apart. The number of speaker drivers in each ring may be chosen so that the center-to-center spacing of the speaker drivers is about 25.4 mm.

The Legendre attenuation values for the speaker drivers of the loudspeaker enclosures 2200 and 2300 may be calculated using equations (1) or (3) above; in the same manner disclosed above for calculating the attenuation values for the loudspeaker enclosure 100. For the loudspeaker enclosures 2200 and 2300, each radial ring of speaker drivers may use the same attenuation value. Therefore, the loudspeaker enclosures 2200 and 2300 may use a total of thirteen attenuation values each.

For the enclosure 2300, a common signal delay of time ($T_x$) may be used for each of the thirteen rings. Table 2 shows example Legendre attenuation levels for the rings of both of the loudspeaker enclosures 2200 and 2300 as calculated by equation (3). Table 2 also shows an example signal delay of time ($T_x$) for each ring of the enclosure 2300. The attenuation values may also be quantized, in a manner similar to that described above for the loudspeaker enclosure 100.

TABLE 2

| Ring Number | Legendre Attenuation (dB) | Delay Time Tx (μS) |
|---|---|---|
| 0 (Center) | 0.0 dB | 0.00 |
| 1 | 0.0 dB | 1.54 |
| 2 | −0.2 dB | 6.15 |
| 3 | −0.5 dB | 13.86 |
| 4 | −1.0 dB | 24.72 |
| 5 | −1.6 dB | 38.76 |
| 6 | −2.4 dB | 56.07 |
| 7 | −3.4 dB | 76.73 |
| 8 | −4.6 dB | 100.87 |
| 9 | −6.1 dB | 128.61 |
| 10 | −8.0 dB | 160.13 |
| 11 | −10.5 dB | 195.64 |
| 12 | −14.2 dB | 235.39 |
| 13 (Outside) | −20.3 dB | 279.68 |

In conclusion, loudspeaker enclosures having constant-beamwidth characteristics may be designed and constructed based on the mathematical formulas, drawings, and descriptions in this disclosure. A constant-beamwidth loudspeaker enclosure may include an array of speaker drivers that are attenuated with Legendre attenuation levels. These Legendre attenuation levels may be a function of each speaker driver's location in the loudspeaker enclosure. The loudspeaker enclosure may be actually or virtually curved to facilitate constant-beamwidth operation.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A loudspeaker system, the loudspeaker system comprising:

a frame;

an array of speaker drivers, where the array of speaker drivers is coupled to the frame and aligned in a frontal plane; and a circuit configured to apply a plurality of delay levels to an incoming signal to place the array of speaker drivers in a virtual arc in a plane perpendicular to the frontal plane, where the circuit is further configured to also apply a plurality of attenuation levels to the incoming signal, so that each speaker driver of the array of speaker drivers is configured to receive a driving electrical signal based on the incoming signal that causes a respective speaker driver of the array of speaker drivers to generate a respective acoustic output, where each respective acoustic output is combined to form a directional sound field having a substantially constant beamwidth across an operational frequency range.

2. The loudspeaker system of claim 1, where each of the plurality of attenuation levels corresponds to a position along the virtual arc.

3. The loudspeaker system of claim 1, where the circuit comprises a plurality of delay circuits, where each of the plurality of delay circuits corresponds to one of the plurality of delay levels, and where each of the plurality of delay circuits is configured to receive a driving electrical signal prior to receipt by the respective speaker driver.

4. The loudspeaker system of claim 3, where at least one of the plurality of delay circuits is an analog circuit.

5. The loudspeaker system of claim 3, where at least one of the plurality of delay circuits is a digital circuit.

6. The loudspeaker system of claim 1, where the circuit comprises a plurality of attenuation circuits, where each of the plurality of attenuation circuits corresponds to one of the plurality of attenuation levels, where each of the plurality of attenuation circuits is configured to receive the incoming signal.

7. The loudspeaker system of claim 6, where at least one of the plurality of attenuation circuits is an analog circuit.

8. The loudspeaker system of claim 6, where at least one of the plurality of attenuation circuits includes a sound amplifier.

9. The loudspeaker system of claim 1, where each speaker driver of the array of speaker drivers is placed at a respective angle on the virtual arc with respect to a reference plane perpendicular to both the frontal plane and to the plane perpendicular to the frontal plane, where each driving electrical signal is based on a respective one of the plurality of attenuation levels, and where each of the plurality of attenuation levels corresponds to a respective angle along the virtual arc.

10. The loudspeaker system of claim 9, where each respective one of the plurality of attenuation levels is derived from a Legendre function based on the respective angle of the speaker driver of the array of speaker drivers.

11. The loudspeaker system of claim 9, where adjacent speaker drivers of the array of speaker drivers are about equally spaced from one another along the frontal plane, where the radius of the virtual arc is $$R = \frac{H_T}{2\sin\frac{\theta_T}{2}}$$

where R=radius of the virtual arc, $H_T$=overall height of the virtual arc, and $\theta_T$=angle of the virtual arc.

12. The loudspeaker system of claim 11, where the respective angle of each speaker driver along the virtual arc with respect to the reference plane is $$\theta_S = \sin^{-1}\left(\frac{h}{R}\right)$$

where $\theta_s$=respective angle of each speaker driver, and h=speaker driver height.

13. The loudspeaker system of claim 12, where each speaker driver of the array of speaker drivers is offset from the frontal plane to the virtual arc along an axis perpendicular to the frontal plane, where each speaker driver is offset by a respective distance $D_s$, where $D_s=R(1-\cos(\theta_S))$, where each of the plurality of delay levels is associated with at least one speaker driver of the array of speaker drivers, where each of the plurality of delay levels is $T=D_s/c$ where T is a delay level in time, and c=speed of sound.

14. The loudspeaker system of claim 1, where application of the plurality of delay levels to the incoming signal acoustically places the array of speaker drivers in the virtual arc, where each of the speaker drivers is perceived to generate the respective acoustic output from the virtual arc.

15. A method of generating a directional sound field from a loudspeaker system including a plurality of speaker drivers, the method comprising:

aligning the plurality of speaker drivers along a first plane;

receiving an incoming signal;

applying a plurality of predetermined phase delay levels to the incoming signal to generate a respective input signal for each of the plurality of speaker drivers and to place the plurality of speaker drivers in a virtual arc;

applying a predetermined attenuation level to each respective input signal to form a respective attenuated input signal;

driving each of the plurality of speaker drivers with the respective attenuated input signal to generate a respective acoustic output; and combining each respective acoustic output to form a directional sound field due to each respective attenuated input signal, the acoustic output having a substantially constant beamwidth across an operational frequency range, where the directional sound field is directed in a radially outward direction away from the virtual arc.

16. The method of claim 15, where applying a plurality of predetermined phase delay levels comprises receiving the incoming signal with a plurality of phase delay circuits to generate a respective input signal for each of the plurality of speaker drivers and to place the plurality of speaker drivers in a virtual arc, where each of the plurality of phase delay circuits provides one of the plurality of predetermined phase delay levels.

17. The method of claim 15, where applying a predetermined attenuation level to each respective input signal comprises receiving each respective input signal with a respective attenuation circuit having a predetermined attenuation level, where each predetermined attenuation level is associated with a position along the virtual arc.

18. The method of claim 15, where applying a predetermined attenuation level to each respective input signal comprises applying a predetermined attenuation level, where each predetermined attenuation level is derived from a Legendre function based on a position along the virtual arc.

19. A loudspeaker system, the loudspeaker system comprising:

an input terminal configured to receive an incoming electrical signal;

a frame; and a circuit coupled to the input terminal that includes an array of speaker drivers, where the array of speaker drivers is secured to the frame along a frontal plane;

where the circuit includes a delay stage to place the array of speaker drivers in a virtual arc having a curvature over a range of angles from −A to +A in a plane perpendicular to the frontal plane, and an attenuation stage so that each speaker driver of the array of speaker drivers is configured to receive a driving electrical signal based on the incoming electrical signal that causes a respective speaker driver of the array of speaker drivers to generate a respective acoustic output with a respective sound pressure level that is based on a respective angle $A_x$ of the respective speaker driver that is greater than angle −A and less than angle +A, and respective acoustic outputs from the array of speaker drivers are configured to combine to form a directional sound field having a substantially constant beamwidth across an operational frequency range, where the directional sound field is directed in a radially outward direction away from the virtual arc.

20. The loudspeaker system of claim 19, where the attenuation stage includes a plurality of attenuation levels, where each of the plurality of attenuation levels corresponds to a respective angle $A_x$, and where each of the plurality of attenuation levels is derived from a Legendre function based on the corresponding respective angle $A_x$.

21. The loudspeaker system of claim 19, where the attenuation stage includes a plurality of attenuation levels, where each of the plurality of attenuation levels corresponds to a respective angle $A_x$, and where each of the plurality of attenuation levels is derived from a series approximation of a Legendre function based on the corresponding respective angle $A_x$.

22. The loudspeaker system of claim 19, where the attenuation stage comprises a plurality of attenuation circuits, where each of the plurality of attenuation circuits includes an impedance value based on a respective angle $A_x$.

23. The loudspeaker system of claim 19, where the array of speaker drivers comprises at least eight speaker drivers.

24. The loudspeaker system of claim 19, where the attenuation stage includes a plurality of attenuation levels, where each attenuation level corresponds to a respective angle $A_x$ and a respective angle $-A_x$.

25. The loudspeaker system of claim 19, where the delay stage comprises a plurality of delay circuits each having a different delay level.

26. The loudspeaker system of claim 19, where the delay stage comprises a plurality of delay levels, where each of the plurality of delay levels is based on an absolute value of a respective angle $A_x$.

27. A loudspeaker system comprising:

an input terminal configured to receive an incoming electrical signal;

a speaker frame; and a circuit coupled to the input terminal, where the circuit includes a first array of speaker drivers and a second array of speaker drivers, where the first array of speaker drivers and the second array of speaker drivers are coupled to the speaker frame, and where the first array of speaker drivers are aligned along a first plane;

where the circuit is configured to apply a plurality of delay levels to the incoming signal to place the first array of speaker drivers in a virtual arc in a plane perpendicular to the first plane, where the circuit is further configured to apply a plurality of attenuation levels to the incoming signal, so that each speaker driver of the first array of speaker drivers is configured to receive a first driving electrical signal based on the incoming electrical signal that causes a respective speaker driver of the first array of speaker drivers to generate a first respective acoustic output, where each first respective acoustic output is combined to form a first directional sound field based on application of the plurality of delay levels, the first directional sound field having a substantially constant beamwidth across a first operational frequency range.

28. The loudspeaker system of claim 27, where each speaker driver in the second array of speaker drivers is configured to receive a second driving electrical based on the incoming signal that causes a respective speaker driver of the second array of speaker drivers to generate a second respective acoustic output, where the second array of speaker drivers has a second operational frequency range different than the first operational frequency range.

29. The loudspeaker system of claim 28, where the first operational frequency range includes a first band of frequencies higher than the second operational frequency range.

30. The loudspeaker system of claim 27, where the second array of speaker drivers are aligned along a second plane parallel to the first plane.

* * * * *